United States Patent
Guim Bernat et al.

(10) Patent No.: US 12,041,177 B2
(45) Date of Patent: Jul. 16, 2024

(54) METHODS, APPARATUS AND SYSTEMS TO SHARE COMPUTE RESOURCES AMONG EDGE COMPUTE NODES USING AN OVERLAY MANAGER

(71) Applicant: Intel Corporation, Santa Clara, CA (US)

(72) Inventors: Francesc Guim Bernat, Barcelona (ES); Ned Smith, Beaverton, OR (US); Kshitij Doshi, Tempe, AZ (US); Rajesh Gadiyar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 17/033,446

(22) Filed: Sep. 25, 2020

(65) Prior Publication Data

US 2021/0021431 A1     Jan. 21, 2021

(51) Int. Cl.
| | | |
|---|---|---|
| *H04L 47/765* | (2022.01) | |
| *H04L 9/32* | (2006.01) | |
| *H04L 47/74* | (2022.01) | |
| *H04L 47/78* | (2022.01) | |
| *H04L 67/1074* | (2022.01) | |
| *H04L 9/00* | (2022.01) | |

(52) U.S. Cl.
CPC .......... *H04L 9/3247* (2013.01); *H04L 9/3215* (2013.01); *H04L 47/748* (2013.01); *H04L 47/765* (2013.01); *H04L 47/781* (2013.01); *H04L 67/1078* (2013.01); *H04L 9/50* (2022.05)

(58) Field of Classification Search
CPC ... H04L 9/3247; H04L 9/3215; H04L 47/748; H04L 47/765; H04L 47/781; H04L 67/1078; H04L 9/50
USPC ........................................................ 713/170
See application file for complete search history.

(56) References Cited

U.S. PATENT DOCUMENTS

| | | | | |
|---|---|---|---|---|
| 7,065,579 | B2* | 6/2006 | Traversat | H04L 63/0428 709/225 |
| 7,206,841 | B2* | 4/2007 | Traversat | H04L 67/1061 709/227 |
| 7,558,859 | B2* | 7/2009 | Kasiolas | G06Q 40/04 705/37 |
| 11,637,708 | B2* | 4/2023 | Hung | H04L 9/3247 713/168 |
| 2002/0184357 | A1* | 12/2002 | Traversat | H04L 61/00 709/223 |
| 2007/0250430 | A1* | 10/2007 | Sholtis | G06Q 40/04 705/37 |

(Continued)

Primary Examiner — Thanh T Le
(74) Attorney, Agent, or Firm — HANLEY, FLIGHT & ZIMMERMAN, LLC

(57) ABSTRACT

Methods, systems and apparatus disclosed herein create an overlay of nodes to permit the nodes to engage in a peer-to-peer resource bidding process. An example apparatus at an edge of a network includes a first configurer to configure a network interface of a first node of the network in a first configuration, the first configuration to permit the first node to participate in a peer-to-peer resource bidding process with a plurality of other nodes of the network. The apparatus further includes a second configurer to configure the network interface of the first node of the network in a second configuration, the second configuration to prevent the first node from participation in the peer-to-peer resource bidding process.

18 Claims, 23 Drawing Sheets

(56) References Cited

U.S. PATENT DOCUMENTS

| | | | |
|---|---|---|---|
| 2009/0310518 A1* | 12/2009 | Jayaram | H04L 45/00 370/254 |
| 2011/0238505 A1* | 9/2011 | Chiang | G06Q 30/0273 705/26.1 |
| 2012/0284383 A1* | 11/2012 | Dudek | G06F 9/5027 709/223 |
| 2012/0284410 A1* | 11/2012 | Dudek | G06F 9/5027 709/226 |
| 2014/0164167 A1* | 6/2014 | Taylor | G06Q 30/0611 705/26.4 |
| 2014/0355463 A1* | 12/2014 | Smith | H04W 36/0016 370/252 |
| 2019/0180291 A1* | 6/2019 | Schmeling | G16H 20/10 |
| 2020/0014699 A1* | 1/2020 | Bachmann | H04L 63/20 |
| 2020/0110641 A1* | 4/2020 | Hollinger | G06F 9/505 |
| 2020/0349613 A1* | 11/2020 | Xi | G06Q 30/0255 |
| 2020/0380589 A1* | 12/2020 | Clark | G06Q 20/223 |
| 2023/0052608 A1* | 2/2023 | Wattiau | H04L 9/3271 |

\* cited by examiner

METHODS, APPARATUS AND SYSTEMS TO SHARE COMPUTE RESOURCES AMONG EDGE COMPUTE NODES USING AN OVERLAY MANAGER

FIELD OF THE DISCLOSURE

This disclosure relates generally to sharing compute resources among compute nodes, and, more particularly, to methods, apparatus, and systems to share compute resources among edge compute nodes using an overlay manager.

BACKGROUND

In recent years, compute resources residing at network edges are expanding rapidly due to a need to support the rapid proliferation of devices that makeup the Internet of Things. The pooling of such resources is typically performed at the cloud level of the Internet but can also be performed at the edge level of the Internet.

BRIEF DESCRIPTION OF THE DRAWINGS

The figures are not to scale. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Computing in edge clouds is highly decentralized. It is emerging as a special category of operations in which events and requests and data streams are processed in a manner that should lead to low and deterministic latency responses. Examples disclosed herein show, at a high level, a concept of three tier computation and data processing, with an edge tier as a middle tier. In that middle tier, many different edge computing, communication, and storage resources are aggregated flexibly and dynamically in hierarchical or peer-to-peer relationships for meeting response-time and communication bandwidth critical needs locally (middle), and mobilizing the deeper and richer resource networks in traditional clouds (right) for complex, computation intensive operations.

Figure 1:
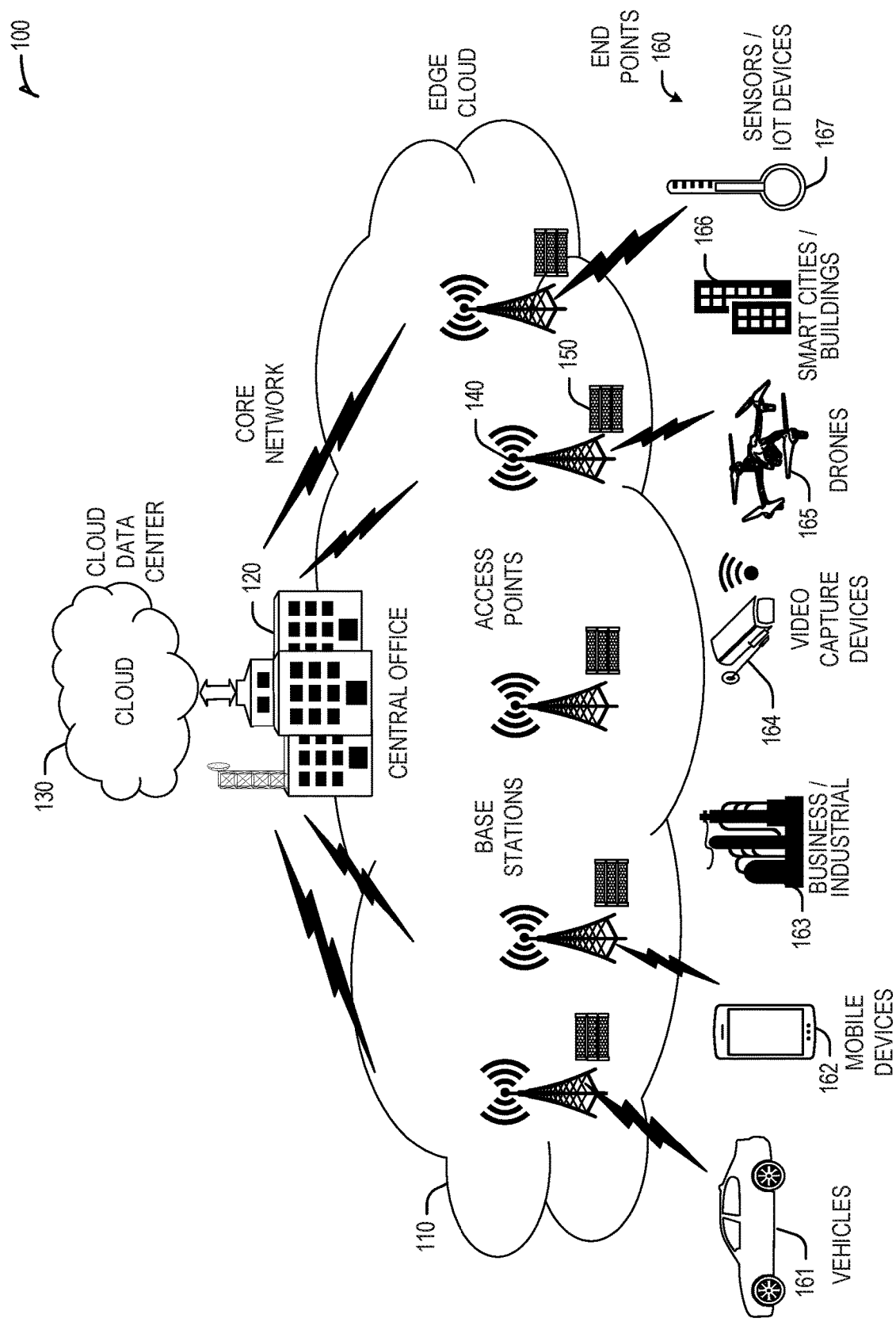
FIG. 1 illustrates an overview of an edge cloud configuration for edge computing.

Ever greater performance and capabilities and specializations have been integrated into devices, and modern edge clouds are drawing myriads of such devices into versatile interactions to service torrents of processing needs in real time. FIG. 1 illustrates the variety of performance and function specializations available within such ensembles at the IoT edge.

However, a difficulty is in dynamic match-making for such collaboration. Unlike traditional backend databases, these ensembles of capabilities operate in a largely non-centralized fashion and machines may enter/leave various virtual networks at a continuous pace and may swing between being under-subscribed and over-subscribed. This challenge is amplified by the divergent interests of many parties: an edge content security policy (CSP) is typically interested in minimizing total cost of ownership (TCO) and maximizing monetization of resources; various solution providers and consumers each want high performance with stringent service level agreement (SLA) guarantees within a given cost envelope, and so on. The conditions in the edge IoT network change rapidly and given the need for real-time response. As a result, it is challenging, if not impossible to perform global matchmaking between needs and availabilities.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
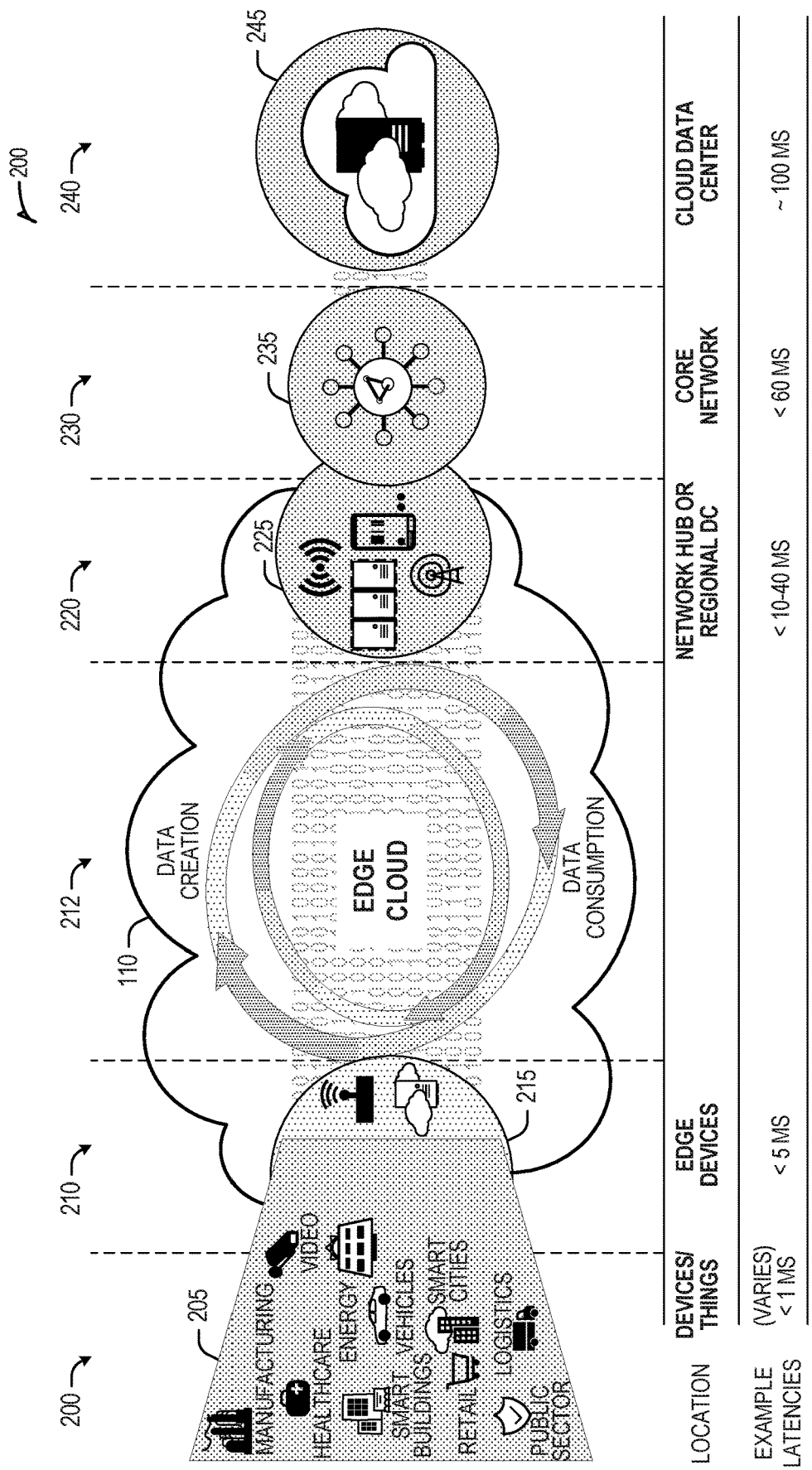
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210 (e.g., a "near edge" or "close edge" layer), to even between 10 to 40 ms when communicating with nodes at the network access layer 220 (e.g., a "middle edge" layer). Beyond the edge cloud 110 are core network 230 and cloud data center 240 layers, each with increasing latency (e.g., between 50-60 ms at the core network layer 230, to 100 or more ms at the cloud data center layer, both of which may be considered a "far edge" layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 20B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
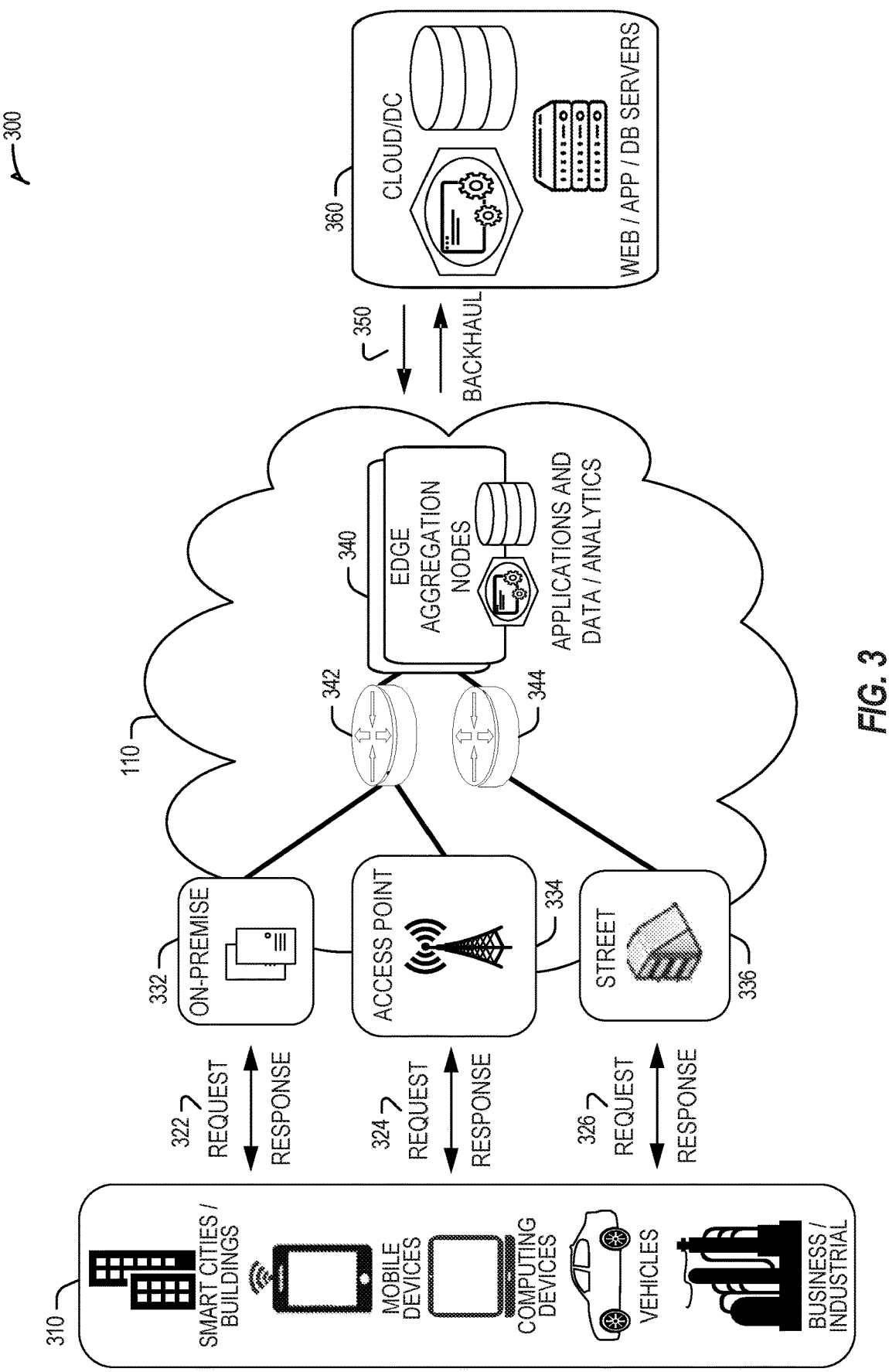
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
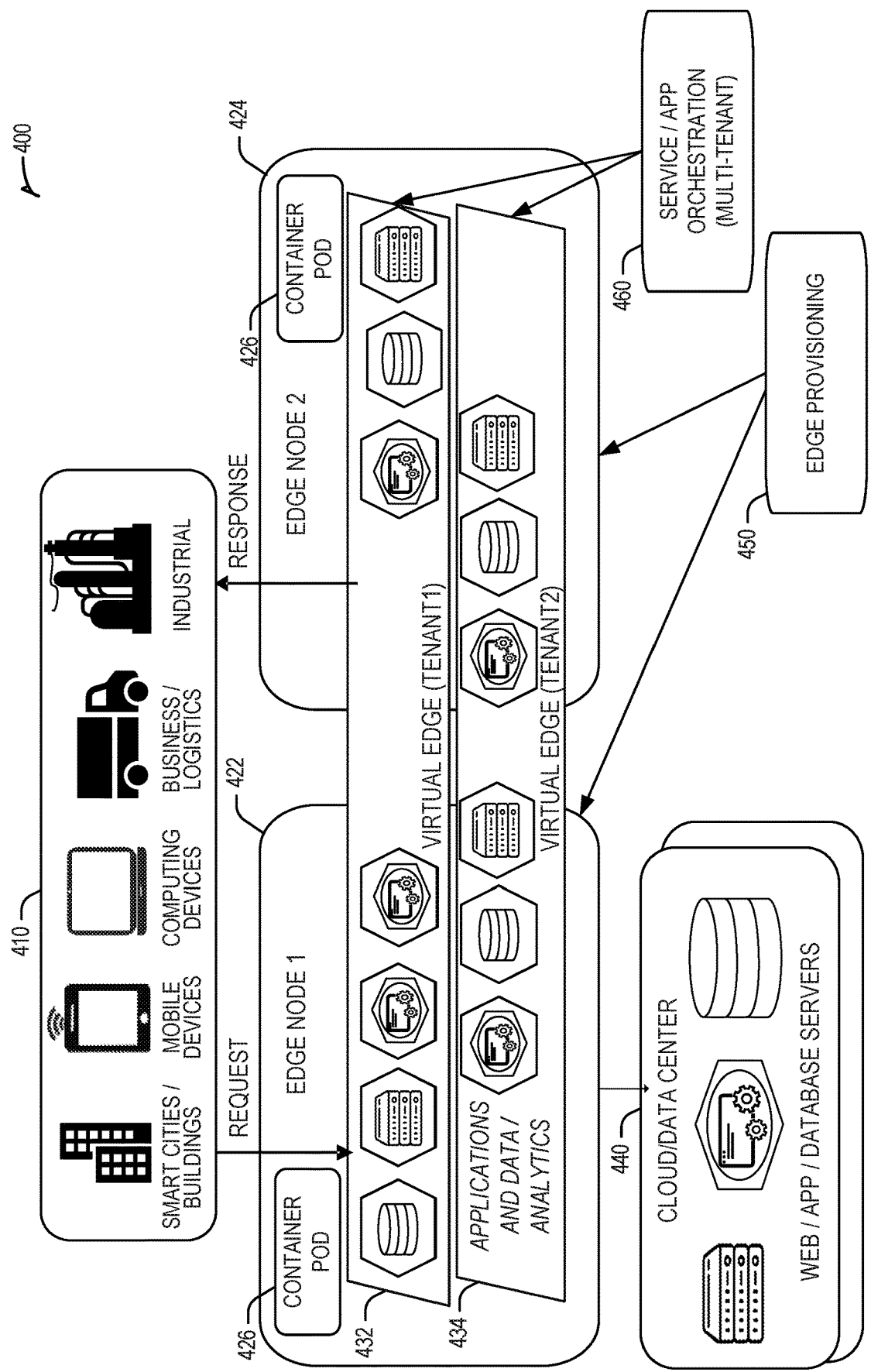
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 5:
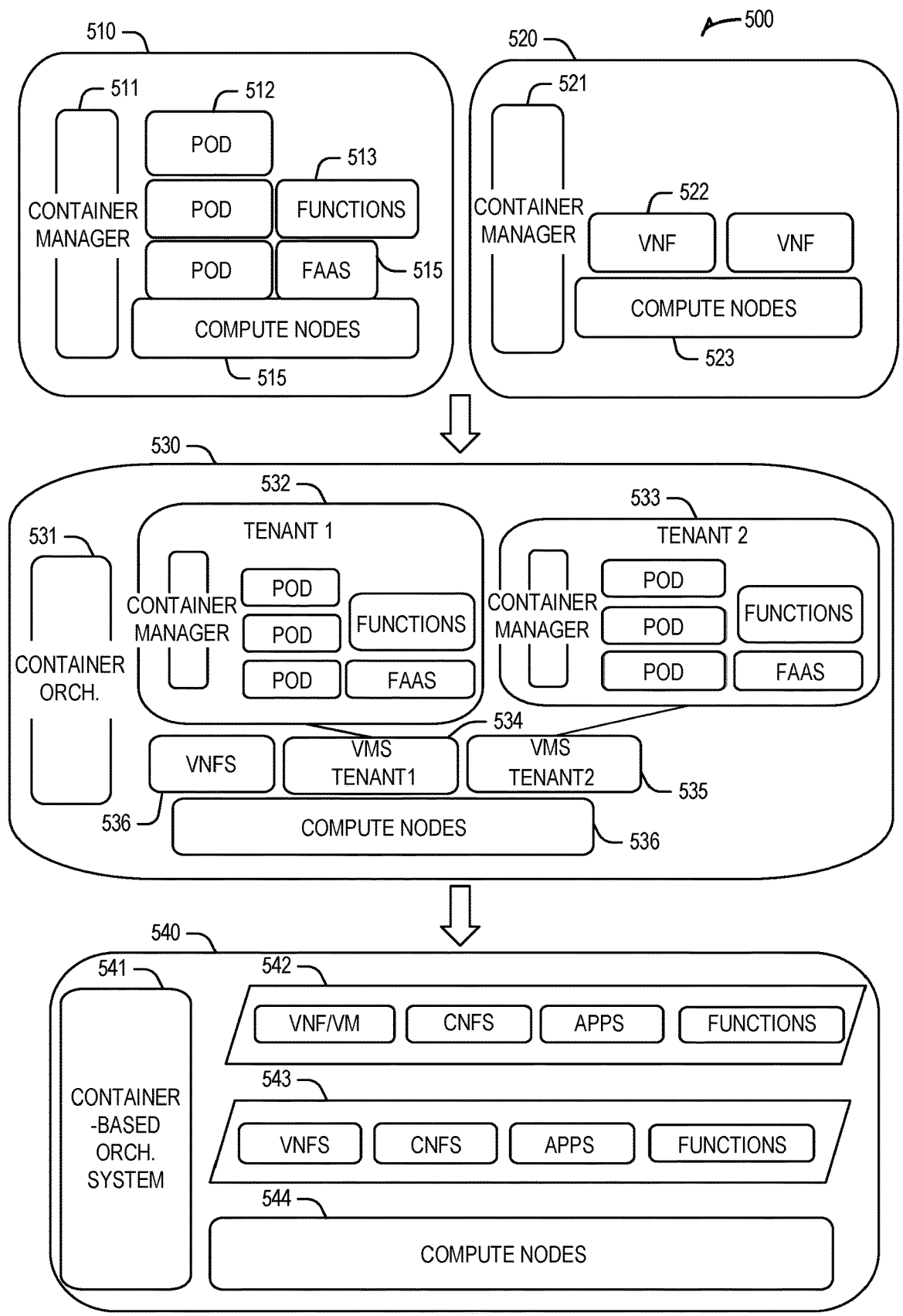
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 536), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
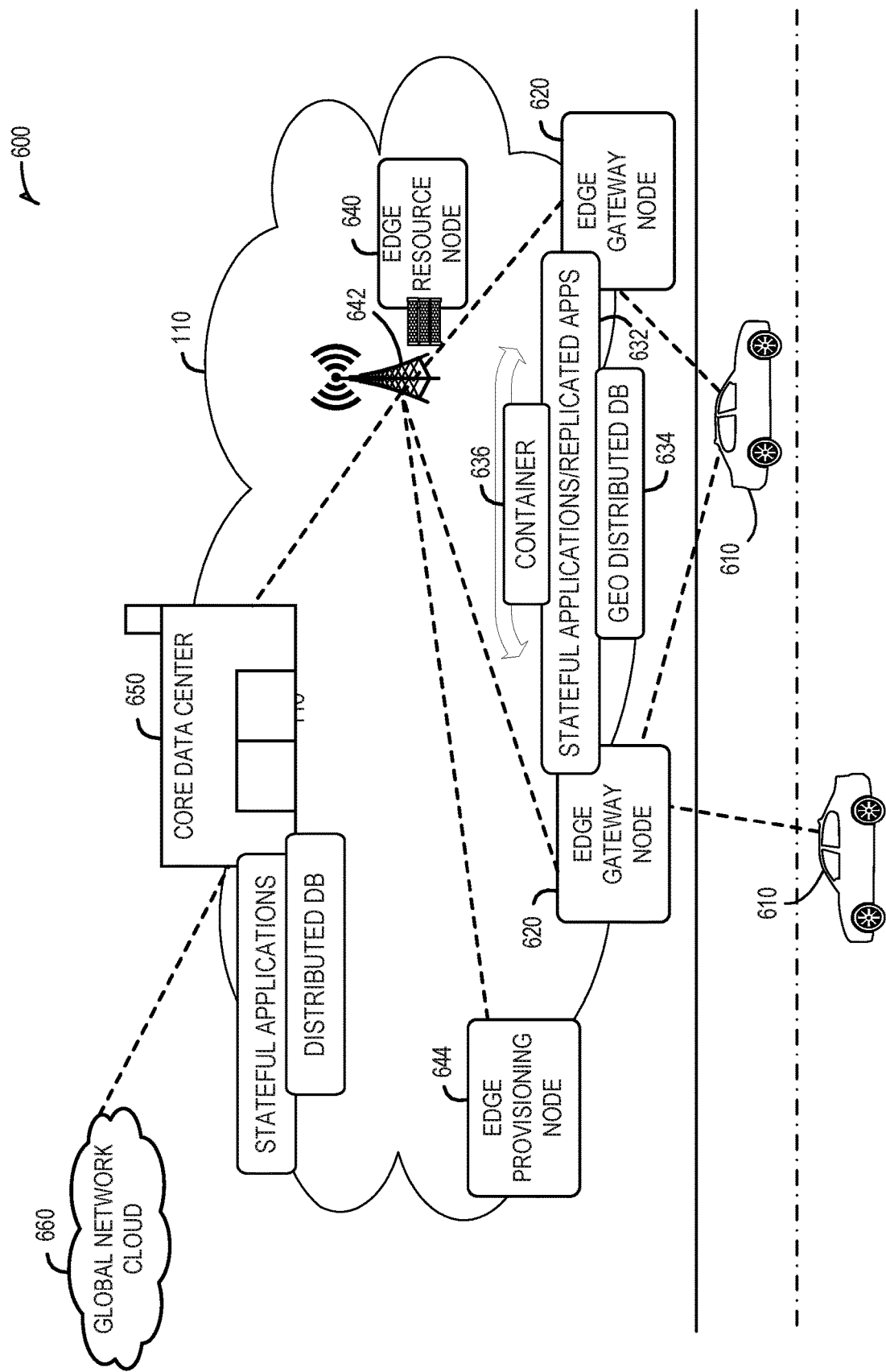
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 2082 of FIG. 20B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 2082 of FIG. 20BB. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 2082 of FIG. 20B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 2082 of FIG. 20B, may be downloaded to the example processor platform/s, which is to execute the computer readable instructions 2082 to implement the methods described herein.

In some examples, the processor platform(s) that execute the computer readable instructions 2082 can be physically located in different geographic locations, legal jurisdictions, etc. In some examples, one or more servers of the edge provisioning node 644 periodically offer, transmit, and/or force updates to the software instructions (e.g., the example computer readable instructions 2082 of FIG. 20B) to ensure improvements, patches, updates, etc. are distributed and applied to the software instructions implemented at the end user devices. In some examples, different components of the computer readable instructions 2082 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 20A and 20B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
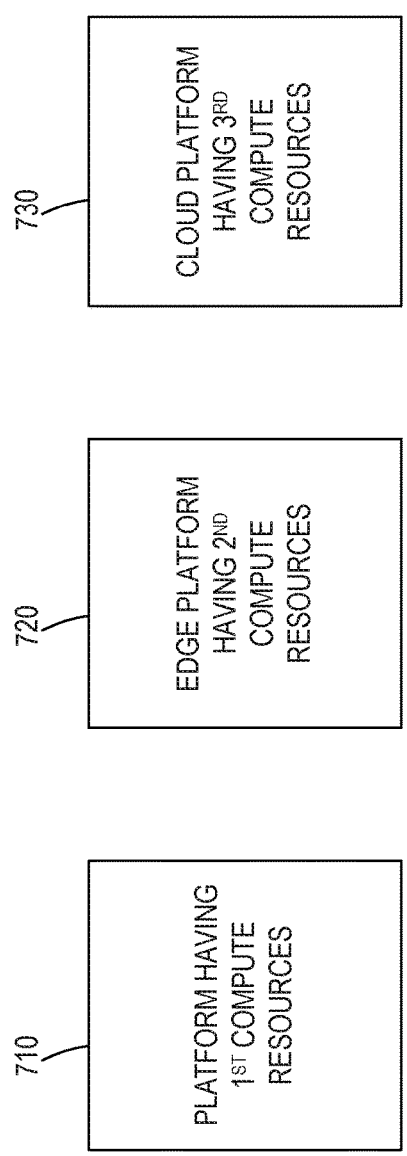
FIG. 7 is a block diagram of an example three-tier network having an IoT platform, an edge platform, and a cloud platform.

FIG. 7 is a block diagram of an example three tier network 700 including an Internet of Things (IoT) platform 710 having first compute resources, an edge platform 720 having second compute resources installed at an edge of the three tier network 700, and a cloud platform having third compute resources 730 residing in the cloud. The first compute resources 710 are collectively referred to herein as IoT devices 710, the second compute resources 720 are collectively referred to herein as edge devices 720, and the third compute resources 730 are collectively referred to herein as cloud devices 730. In some examples, the edge devices 720 are capable of performing compute tasks on behalf of one or more of the IoT devices 710 and the edge devices 720 and IoT devices 710 can rely on one or more of the cloud devices 730 to perform one or more compute tasks on behalf of the IoT devices 710 and/or on behalf of the edge devices 720.

In some examples, one or more of the IoT devices 710, the edge devices 720, and the cloud devices 730 include (and/or are implemented using) compute nodes. In some examples, the compute nodes are implemented using the node 2000 of FIG. 20A and/or the edge computing node 2050 of FIG. 20B. In some examples, at any given time, the compute nodes of one or more of the edge devices 720, the IoT devices 710, and/or the cloud devices 730 may be assigned a quantity or quality of tasks that cause the resources of the assigned compute nodes (also referred to herein as nodes) to be under-utilized or over-utilized. To improve the operational efficiency of the combined compute/processing resources of the edge devices 720, the IoT devices 710, and/or the cloud devices 730, the nodes of one or more of such devices share resources with others of such devices. In the example three tier network system 700 of FIG. 7, the compute nodes of the IoT devices 710, the edge devices 720, and the cloud devices 730 participate in a resource bidding process performed in a peer-to-peer fashion to share resources and thereby improve the utilization, efficiency, speed, accuracy, etc. of the compute resources manifested in the IoT platform, the edge platform and the cloud platform. It will be understood that although the example three tier network 700 is illustrated using a single IoT platform 710, a single edge platform 720 and a single cloud platform 730, the three tier network can include multitudes of such platforms in communication as needed to operate as (implement) a three tiered network 700.

Figure 8:
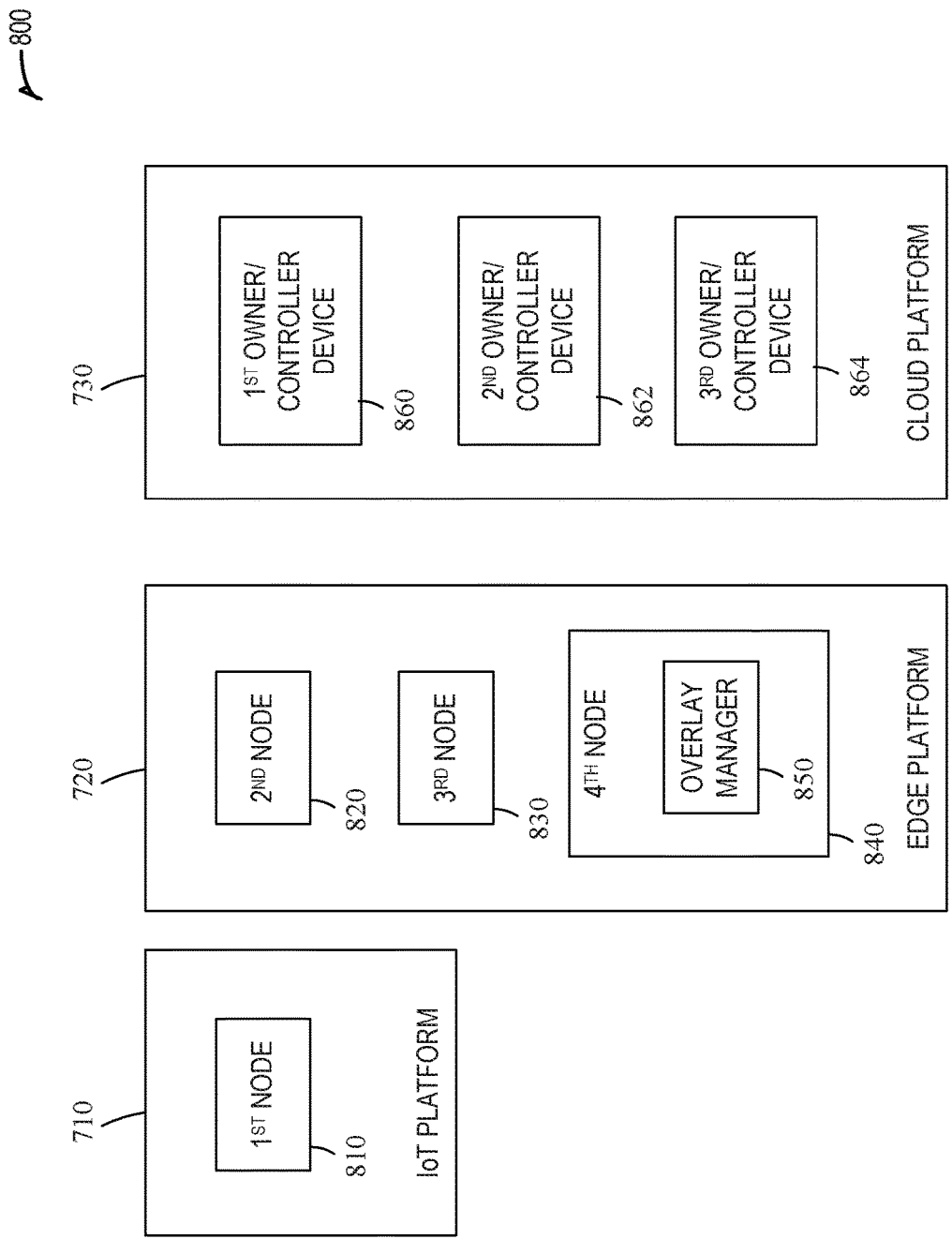
FIG. 8 is a block diagram of example compute nodes (resources/devices) residing in the platforms of FIG. 7, including first, second, third and fourth compute nodes.

FIG. 8 is a block diagram 800 of the example three tier network 700 of FIG. 7 in which example devices residing in the various layers are shown. In some examples, the devices include an example first node 810, an example second node 820, an example third node 830, an example fourth node 840, an example overlay manager 850, an example first owner/controller device 860, an example second owner/controller device 862, and an example third owner/controller device 864. In some examples, any of the first node, 810, the second node 820, the third node 830, and the fourth node can be configured to participate in the peer-to-peer resource bidding process. In the example block diagram of FIG. 8, any of the first, second, third nodes and fourth node 810, 820, 830, and 840, respectively, expose and share compute resources with others of the nodes. Further, different ones of the first node 810, the second node 820, the third node 830, and the fourth node 840 can be under the ownership/control of different ones of the first, second and third owner/controller devices 860, 862, 864, respectively. The owner/controller devices 860, 862, 864, respectively, can be owned/controlled by entities such as businesses, utilities, government operations, individuals, etc. In some examples, a single entity can have ownership/control of multiples ones of the first, second and third nodes 810, 820, 830, respectively.

In some examples, the owner/controller devices 860, 862, 864 can be implemented as nodes or include nodes. In the example of FIG. 8, the first node 810 resides in and/or implements an IoT device of the IoT platform 710, the second node 820, the third node 830, and the fourth node 840 reside in and/or implement edge devices of the edge platform 720, and the first owner/controller device 860, the second owner/controller device 862, and the third owner/controller device 864 reside in and/or implement cloud devices of the cloud platform 730. However, in some examples, the first node 810, the second node 820, the third node 830, and the fourth node 840 can reside in or implement any of the IoT devices of the IoT platform, the edge devices of the edge platform 720, and/or the cloud devices of the cloud platform 730. Likewise, the first owner/controller device 860, the second owner/controller device 862, and the third owner/controller device 864 can reside in and/or be implemented as cloud devices of the cloud platform 730 or in any of the other platforms.

In some examples, the fourth node 840 implements the overlay manager 850. The overlay manager 850 creates a group containing one or more of the first, second, and/or third nodes 810, 820, 830, respectively, and/or any nodes of the three tier network 700 associated with or implemented as any of the devices of any of the platforms of the three tier network 700. The nodes included in the group (also referred to as an example overlay) are configured to participate in the peer-to-peer resource bidding process. In some examples, the overlay manager 850 can also change the nodes included in the overlay by removing one or more of the nodes or by adding additional nodes. Any nodes (e.g., any of the first node, the second node, and/or the third node) removed from the overlay are prevented from participating in the peer-to-peer resource bidding process, and any nodes (e.g., any of the first node, the second node, and/or the third node) added to the overlay are permitted/allowed to participate in the peer-to-peer resource bidding process. In some examples, one of the owner controller devices 860, 862, 864, associated with an entity that owns/controls a node determines whether that node is to be added to the overlay such that the node can partake in the peer-to-peer resource bidding process. In some examples, any nodes to be added to the overlay are added by an associated one of the owner/controller devices 860, 862, 864 (e.g., at the behest of an associated one of the owner/controller entities) and such nodes can be added to the overlay only after being authenticated by the overlay manager 850, as described below. Thus, the constitution of the overlay created by the overlay manager 850 is flexible and changes dynamically based on the desires of the owner/controller entities and subsequent authentication by the overlay manager 850.

Figure 9:
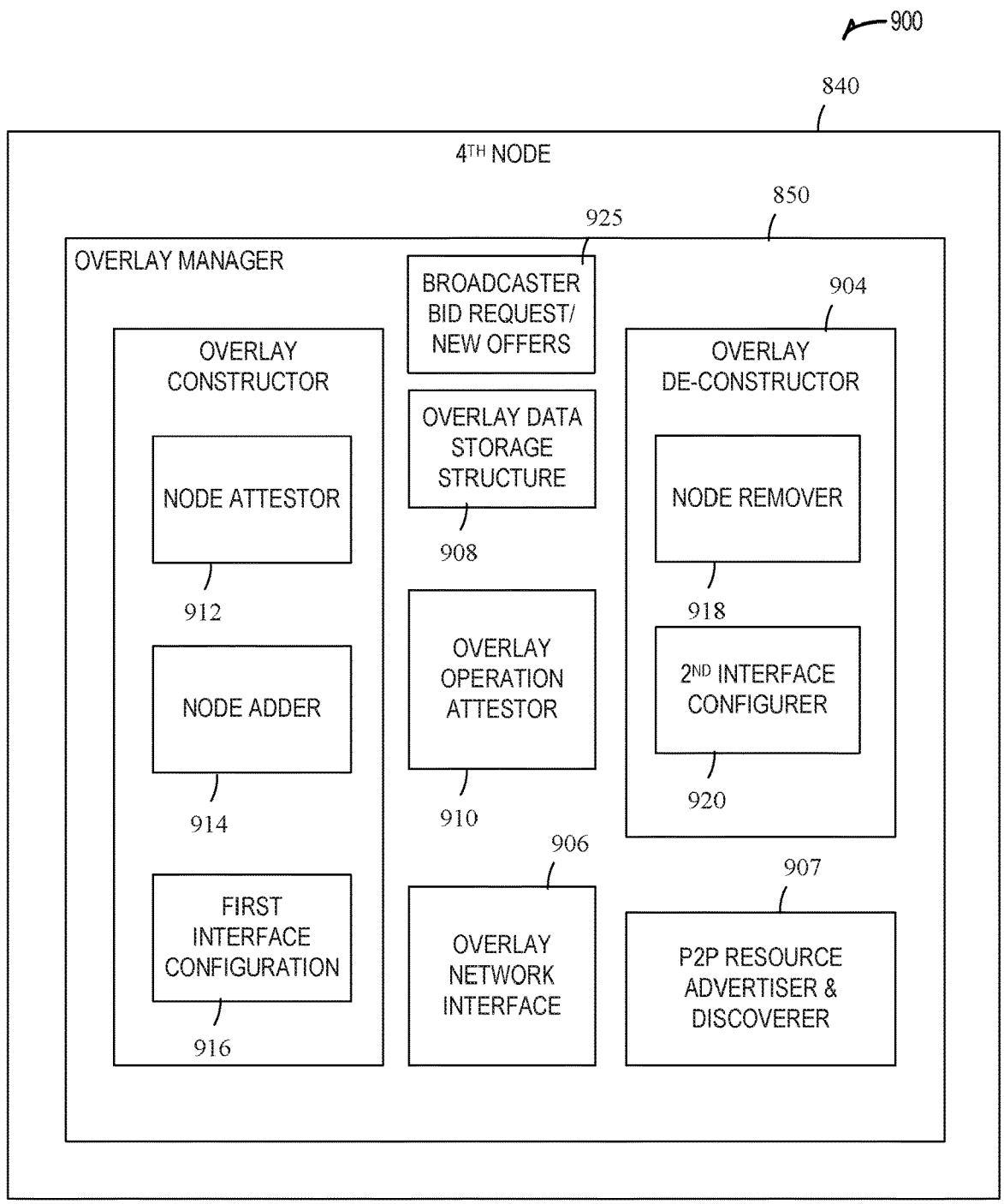
FIG. 9 is a block diagram of an example overlay manager of the fourth compute node of FIG. 8.

FIG. 9 is a block diagram of the overlay manager 850 included in the fourth node of FIG. 8. In some examples, the overlay manager 850 includes an example overlay constructor 902, an example overlay de-constructor 904, an example overlay network interface 906, an example resource discoverer and advertiser 907, an example overlay data storage structure 908, and an example overlay operation attestor 910. The overlay constructor 902 can include an example node attestor 912, an example operation attestor 914, an example node adder 914 and an example first network interface configurer 916 (also referred to herein as a first interface configurer). In some examples, the overlay de-constructor 904 can include an example node remover 918 and an example second network interface configurer 920 (also referred to herein as a second interface configurer). In some examples, the overlay manager 850 is example means for managing an overlay. In some examples, the example overlay constructor 902 is an example means for constructing an overlay, the overlay de-constructor 904 is an example means for de-constructing an overlay, the overlay network interface 906 is example means for interfacing with an overlay network, the resource discoverer and advertiser 907 is example means for storing overlay data, and the overlay operation attestor 910 is example means for attesting to an overlay operation. In some examples, the node attestor 912 is example means for attesting to the authenticity or identity of a node, the example operation attestor 914 is example means for attesting to operations, the example node adder 914 is example means for adding nodes, and the example first network interface configurer 916 (also referred to herein as a first interface configurer) is example first means for configuring a first network interface (or a first interface). In some examples, the example node remover 918 is example means for adding a node and the second network interface configurer 920 is example second means for configuring the first network interface (or the first interface).

Adding a Node to an Overlay Via the Overlay Manager

In an example operation, one of the example nodes (e.g., any of the first (1$^{st}$) node 710, the second (2$^{nd}$) node 720, or the third (3$^{rd}$) node 730), requests inclusion in an overlay via the example overlay network interface 906. The request is sent to the example node attestor 914 of the example overlay constructor 912 and can include information such as an owner/controller entity identifier, a node identifier that uniquely identifies the node making the inclusion request, an identifier of an overlay to which the node is requesting inclusion, etc. In some examples, the request also includes authentication information that can be used by the example node attestor 912 to authenticate/certify the identity of the node. In some examples, the authentication information includes, for example, root of trust (RoT) information associated with the node requesting inclusion. The node attestor 912 responds to the request by using the authentication information (e.g., the RoT) to authenticate/certify the identity of the node requesting inclusion. If the node attestor 912 is able to authenticate/certify the identity of the node requesting inclusion, the node attestor 912 notifies the node adder 914 which, in turn, adds the node identifier (as well as any other pertinent information) to the example overlay data storage structure 908. In addition, the example node adder 914 notifies the example first interface configurer 916 that the node has been included in the overlay. Responsive to this notification, the example first interface configurer 916 configures a configurable overlay interface 1070 of the second node 820 (see FIG. 10) using a first configuration as described further below. In some examples, the first configuration allows the requesting node (e.g., the second node 820) to participate in the peer-to-peer resource bidding process with other nodes included in the overlay (e.g., configuring the configurable overlay interface 1070 of the second (requesting) node 820 serves to register the second (requesting) node 820 as a member of the overlay.)

Peer-To-Peer Resource Advertiser and Discoverer Feature

In some examples, as described with respect to FIG. 7, an overlay can include nodes associated with different edge platforms (e.g., an overlay may include a first number of nodes associated with a first edge platform and a second number of nodes associated with a second edge platform). In some examples, the example Peer-to-Peer Resource Advertiser and Discoverer 907 ("P2P Resource Advertiser and Discoverer") illustrated as being included in the overlay manager 850 of FIG. 2 and FIG. 9 discovers and broadcasts/advertises information about resources/functions/services/algorithms/applications, etc., that are available on an edge platform associated with the second node 820 for use by other nodes of the edge platform 720 as well as for use by still further nodes (not shown) associated with other edge platforms (not shown) included in the overlay. In some examples, the resource availability information discovered and broadcast by the P2P Resource Advertiser and Discoverer 907 can include the availability of particular types of compute resources as well as the performance capacity of such compute resources. By way of example only, the P2P resource advertiser and discoverer 907 can discover and advertise resource availability information for the second node 820. In some examples, such resources can include a CPU Itanium architecture (IA) compute with 20 cores of a particular generation with 10 gigabytes per second (GBS) of memory is available, a 10 FPGA with an available area of 10% with a particular power and frequency is available, an AI accelerator with a particular amount of TOPS is available, etc. In some examples, the P2P resource advertiser and discoverer 907 can specify that the second node also predicts having an amount of future (potentially) available resources. In further examples, resource availability information can specify an amount of ephemeral storage capacity available for a given period of time (current or future). In still further examples, the resource availability information can specify an amount of memory that can be used as a memory pooled using interfaces such as RDMA, a number and identity of services/functions/algorithms/applications/etc. available, and so on. It will be understood that although the P2P resource advertiser and discoverer 907 is illustrated in FIG. 9 as being included in the overlay manager 850, in some examples, each (or at least some) of the edge platforms include an example P2P resource advertiser and discoverer. In some examples, the resource information discovered by the P2P resource advertiser and discoverer 907 is advertised (broadcast or transmitted) to all nodes participating in an overlay for use in engaging in the peer-to-peer resource sharing process.

Using the Overlay Manager to Remove a Node from an Overlay

Referring still to FIG. 9, in some examples, any node included in the overlay (e.g., the first node, the second node, the third node, etc.) can request to be removed from the overlay by transmitting the request to the overlay network interface 906. The request can include information such as an owner/controller entity identifier, a node identifier that uniquely identifies the node making the removal request, an identifier of the overlay from which the node making the removal request, etc. Responsive to the request, the example node remover 918 removes (or causes the removal of) the node identifying information from the node data storage structure. In some examples, the node remover also notifies the second interface configurer 920 of the removal request. In response, the second configurer 920 re-configures the configurable overlay interface of the node making the removal request from a first configuration to a second configuration. The re-configuration of the configurable overlay interface of the node making the removal request, prevents the node from further participation in the overlay. Thus, as a result of the reconfiguring by the second interface configurer 920 and the node remover 918, the removed node (e.g., the second node 820) is prevented from participating in further resource sharing with the other nodes of the overlay using the peer-to-peer resource bidding process disclosed herein.

Overlay Operation Attestation/Authentication

In some examples, the example overlay operation attestor 910 of the overlay manager 850 generates a blockchain operation to track/trace bidding and resource sharing operations occurring in the overlay. In some examples, a blockchain operation added to the blockchain is transmitted with requests for bids and/or with offers (as used herein the terms "offers" and "resource offers" are interchangeable) to perform a resource task associated with the bid (as used herein the terms "bid" and "resource bid" are interchangeable). In some examples, a network fabric interface of each node included in the overlay can include an accelerated logic responsible for signing each of the operations (e.g., bids/offers) added into the overlay blockchain. In some examples, the network fabric interfaces of the nodes can include the bid requestor network interface 1075 (FIG. 10), the offer sharing network interface 1080 (FIG. 10), the configurable overlay interface 1070 (FIG. 10), and/or the overlay network interface 906. Thus, each request for bids and each offer to perform a bid are signed by a node responsible for generating the request for bid or generating the offer to perform the bid, respectively. The signed blockchain record is then added to the blockchain to irrefutably and immutably document the negotiation communications and to document operations that have been successful (e.g., tasks subject to bid that have been successfully completed) and operations that have been unsuccessful (e.g., tasks subject to bid that have not been successfully completed). Thus, in some examples, the operations added to the blockchain can be used to verify a most recent offer is authentic and received from an authenticated node and/or to verify the authenticity of a request for bids that to verify that such a request is received from an authenticated node, etc. Further, the blockchain, in some such examples, acts as a distributed ledger logger that track the negotiations and the performance of a task.

Node Resource Compute Sharing Via a P2P Resource Bidding Process

Overlay Interface Configuration Feature

Figure 10:
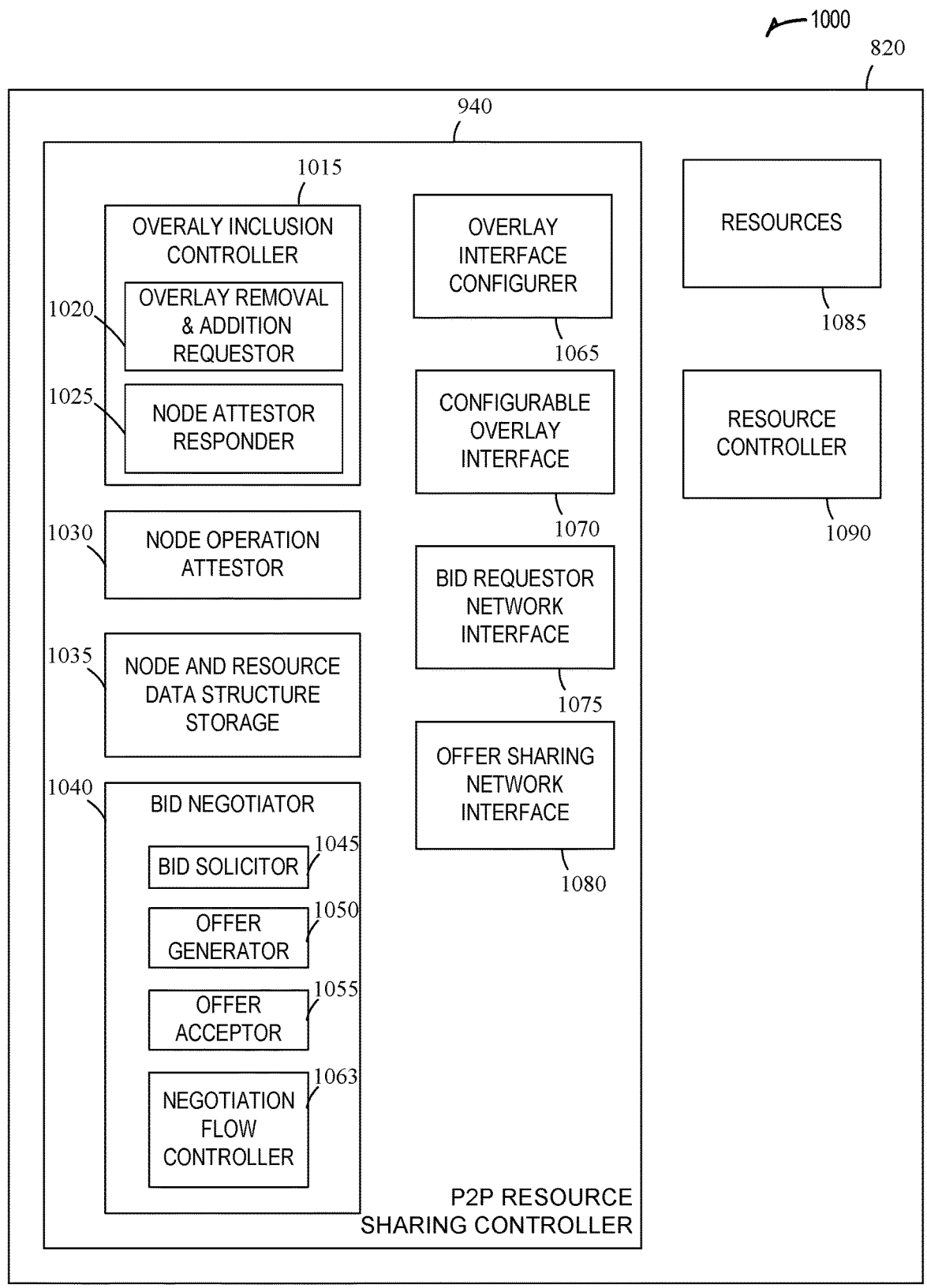
FIG. 10 is a block diagram of the example second node of FIG. 8.

FIG. 10 is a block diagram of the example second node 820 (also illustrated in FIG. 8) having an example P2P resource sharing controller 1010 to control the participation of the second node 820 in a resource sharing overlay, and, thus, the ability or inability to participate in the P2P resource bidding process. In some examples, the P2P resource sharing controller 1010 includes an example overlay inclusion controller 1015 that includes an example overlay removal and addition requestor 1020, and an example node attestor responder 1025. In some examples, the P2P resource sharing controller 1010 also includes an example node operation attestor 1030, an example node and resource data storage structure 1035, and an example bid negotiator 1040. In some examples, the example bid negotiator 1040 includes an example bid solicitor/requestor 1045, an example offer generator 1050, an example offer acceptor 1055, an example negotiation flow controller 1060, and an example bid analyzer 1063. In some examples, the P2P resource sharing controller 1010 further includes an example overlay interface configure 1065, an example configurable overlay interface 1070, an example bid requestor network interface 1075, and an example offer sharing network interface 1080. In some examples, the node 820 also includes one or more compute resources 1085, and a compute resource controller 1090.

In some examples, the example P2P resource sharing controller 1010 is example means to control the participation of the second node 820 in a resource sharing overlay (and, thus, the ability or inability to participate in the P2P resource bidding process). In some examples, the example overlay inclusion controller 1015 is example means for controlling an overlay includer. In some examples, the example overlay removal and addition requestor 1020 is example means for requesting overlay removal and addition, and the example node attestor responder 1025 is example means for responding to a node attestor. In some examples, example node operation attestor 1030 is example means for attesting to a node operation, the example node and resource data storage structure 1035 is example means for storing node and resource data, and the example bid negotiator 1040 is example means for negotiating a bid. In some examples, the example bid solicitor/requestor 1045 is means for soliciting/requesting a bid, the example offer generator 1050 is example means for generating an offer, the example offer acceptor 1055 is example means for accepting an offer, the example negotiation flow controller 1060 is means for controlling a negotiation flow, and the example bid analyzer 1063 is example means for analyzing a bid. In some examples, the example overlay interface configure 1065 is example means for configuring an overlay interface, the example configurable overlay interface 1070 is example means for interfacing with a configurable overlay, the example bid requestor network interface 1075 is example means for interfacing with an example bid requestor, and the example offer sharing network interface 1080 is example means for interfacing with an offer sharing network. In some examples, the example compute resources 1085 are example means for computing, and the example compute resource controller 1090 is example means for controlling compute resources.

Configuring a Node for Addition to the Overlay

In some examples, to prepare for inclusion in an overlay, the example overlay interface configurer 1065 responds to an instruction from the owner/controller device by detecting the nature of the resources 1085 available at the node 820. In some examples, the node 820 (or any of the nodes of FIG. 8), can include multiple resources and/or can execute multiple services/functions/algorithms/applications/etc. In some such examples, the overlay interface configurer 1065 generates a unique bitstream to be associated with each (or some) of the resources/services/functions/algorithms, etc. implemented by the node 820. In some examples, the overlay interface configurer 1065 supplies the configurable overlay interface 1070 with the unique bitstreams and information identifying the corresponding ones of the resources/services/functions/algorithms, etc. If inclusion in the overlay is granted (as determined by the overlay manager 850), the configurable overlay interface 1070 can then use one of the unique bitstreams corresponding to a unique one of the resources/services/functions/algorithms/etc. when communicating with the overlay manager 850 (FIG. 8 and FIG. 9) (or with another of the first and/or third nodes 810, 830) about the unique one of the resources/services/functions/algorithms/etc.

In some examples, after or before the overlay interface configurer 1065 operates to configure the configurable overlay interface 1070 with the unique bitstreams and corresponding resource information, the example overlay removal and addition requestor 1020 of the example overlay inclusion controller 1015 generates a request for inclusion in the overlay. In some examples, the request is generated in response to a signal or instruction from the one of the first, second or third owner/controller devices 860, 862, 864 (FIG. 8) that is associated with an owner of the node 820. In some examples, the generated request can be transmitted by the configurable overlay interface 1070 of the second node 820 to the overlay manager 850 of the fourth node 840. In some examples, the request to join an overlay can include a variety information about the node, such as the resources/services/functions/algorithms/applications/etc., to be made available via the node 820, the bitstreams corresponding to such resources/services/functions/algorithms/applications/etc., operational attributes (speed, accuracy, etc.), and any other relevant information including the information identified above.

In some examples, in response to the request, the node attestor responder 1025 responds to an authentication process conducted by the node attestor 912 (FIG. 9) of the overlay manager 850 to authenticate the identity of the second node 820. In some examples, attestation information generated by the node attestor responder 1025 can be included with the request generated by the overlay removal and addition requestor 1020. In some examples, the authentication process can include generation of a blockchain and/or exposure to a root of trust (RoT).

In some examples, when a request to join an overlay is granted by the overlay manager 850 (FIG. 8), the example overlay inclusion controller 1015 is informed of the node inclusion via, for example, the configurable overlay interface 1070. In addition to notice of inclusion in the overlay, the P2P resource advertiser and discoverer 907 (FIG. 9) can operate to discover any additional information needed about the resources/services/functions/algorithm etc. available at the second node 820 and can further supply similar information about the resources/services/functions/algorithm etc. available at other nodes included in the overlay. In some examples, information identifying the resources/services/functions/algorithm etc. and corresponding other node information is stored in the example node and resource data structure storage 1035 of the P2P resource sharing controller 1010. The information stored in the node and resource data structure storage 1035 can then be used, for example, when determining nodes to which a request for bid is to be directed, when determining whether a type of needed resource is available, etc.

In addition to the configuration activities described above, when a request to join an overlay is granted by the overlay manager 850 (FIG. 8, FIG. 9), the first interface configurer 916 (FIG. 9) of the example overlay constructor 902 (FIG. 9) configures the configurable overlay interface 1070 of the node 820 for inclusion in the overlay. The configuration of the configurable overlay interface 1070 conducted by the first interface configurer 916 operates to enable participation of the second node 820 in the overlay and, thus, access to the P2P resource bidding process. In some examples, the first interface configurer 916 configures a new edge node that has joined an overlay to recognize other nodes acting as bidders/offerors by which such bidders and offerors can communicate bids and offers. In some examples, the first interface configurer 916 can cause the node to be added to supply the interface identifying information to the first interface configurer 916 by transmitting a request or otherwise.

In addition, the first interface configurer 916 requests information identifying an interface of the node to be added to the overlay by which local resources of the node to be added are made available for use by other nodes of the overlay. For example, if node A is offering to give a slice of an FPGA at node A to a node B, then node B needs to be able to use an interface by which node B can access the FPGA slice of node A that node A has offered to node B. In some examples, the respective resources of the compute node 820 are made available via the configurable overlay interface 1070 using the respective unique bitstream information created for the respective resource. In some examples, a different network interface can be used to enable a node B to access resources at a node A, for example.

Generating an Offer in Response to a Request for Bids Feature

Referring still to FIG. 10, in some examples, the example offer sharing network interface 1080 of the second node 820 is configured to receive bid requests generated by other nodes (also referred to herein as peers). In some examples, as described above with reference to FIG. 9, an example request for a bid can include a request from one first node to use a resource of another node to perform/execute/use a particular service/function/algorithm/application/etc., In some examples, the bid request can include any or all of a service type identifier, a service identifier, a cost that the bid requesting node is willing to pay for that service/function/algorithm/etc., a corresponding service level agreement, and, in some instances, other relevant requirements (e.g., accuracy, speed, etc.). In some examples, the example bid analyzer 1063 of the example bid negotiator 1040 analyzes the incoming request for bid to identify the requested service/function/algorithm/application/etc., being requested to determine whether the node can provide the requested resource, and, if so, whether the task requested in the bid can be performed according to the terms (e.g., of the service level agreement, with a defined accuracy, with a defined speed, etc.) included in the bid request. When determining whether the node can provide the requested service/function/algorithm/application/etc., the bid analyzer 1063 can compare the request to the existing resources 1085 at the node and the availability of such existing resources 1085. When the bid analyzer 1063 determines that the node can perform/execute the task identified in the incoming request for bid, the bid analyzer 1036 can notify the offer generator 1050 which responds by generating an offer to perform the requested task identified in the request for bids in accordance with the terms included in the bid request (or using a different set of terms). The offer may identify a cost at which the offering node (the node making the offer) will perform the service/function/algorithm/applications/etc. In some such examples, the offer generator 1050 can supply the offer to the offer sharing network interface 1080 for subsequent transmission to the bid-requesting node. In some examples, the offer sharing network interface 1080 can be configured to transmit the offer using a bit stream defined (or identified) by the overlay configuration interface for the particular service/function/algorithm to be performed/executed in connection with the offer.

Responding to a New Offer Feature

In some examples, a peer/node that made an offer may receive a new offer at the offer sharing network interface 1080. The new offer may be generated by the peer/node that initiated the request for bid (also referred to as the bid initiator). The new offer signals that the bid initiator is attempting to obtain a more competitive offer. In some such examples, the new offer can be received from the overlay manager 850 (FIG. 8 and FIG. 9) which is configured to broadcast any new offers to all (or a subset of) the nodes/peers of the overlay using the bid/offer broadcaster 925. When the new offer is received at the node/peer, the node/peer can respond to the new offer by doing nothing, or the node/peer can determine that it will respond to the new offer by making a second offer (also referred to or known as a counter-offer) that is more competitive than the new offer. In some such examples, the bid analyzer 1063 and offer generator 1050 of the bid negotiator 1040 again work together determine a second offer (e.g., a counter-offer) responsive to the new offer. Other nodes/peers can also respond to the new offer in the same manner. The second offer can include for example, a willingness to perform the service/function/algorithm/application/etc. at a lower price/cost, a willingness to perform the service/function/algorithm/application/etc. at a faster speed or at an improved accuracy, etc. The second offer is transmitted by the offer sharing network interface 1080 to the bid initiator which can respond by generating yet another new offer. In some such examples, the offer sharing network interface 1080 includes a transmitter. In some examples, in which yet another new offer (a counter-counter-offer) is generated, the bid negotiator 1040 again works to determine whether to respond, and if so, to determine the terms of and to generate a third offer to be sent to the bid initiator. This back and forth peer-to-peer bidding process can continue in the manner described until either a latest offer made by an offering node/peer has been accepted (by the offer acceptor 1055) or until an offer made by another of the nodes/peers has been accepted by the bid-initiating node. The process by which the initial bid, subsequent/counter offers are made, and an offer-acceptance occurs is referred to herein as a negotiation/negotiating process.

Making a Request for Bids

In some examples, the example node 820 (e.g., the example resource controller 1090 of the node) determines that resources (additional to its own resources 1085) are needed to complete a task. In some such examples, the resource controller 1090 notifies the example bid solicitor 1045 of the example bid negotiator 1045, and, in response, the bid solicitor 1045 generates a request for the additional, needed resources. The request can include a request for bids to provide access to a resource including access to a service/function/algorithm/application/etc. so that task identified in the request for bids can be performed. In some examples, the request for bids can include a service type identifier identifying the type of service needed, a service identifier, a maximum cost that the bid initiating node is willing to pay, a service level agreement pertaining to the task to be performed, and any other relevant requirements. In some examples, the request for bid is transmitted by the bid requestor network interface 1075 (e.g., the bid requestor network interface includes a transmitter) to the overlay manager 850 (FIG. 8 and FIG. 9) which broadcasts the bid request to the other nodes/peers included in the overlay via the bid/offer broadcaster 925 (FIG. 9).

In some examples, the node/peers in receipt of the request for bid proceed to generate offers (or not) and to respond to new offers (or not) in the manner described above. The negotiation process then proceeds as described above until one of the offers is accepted. In some examples, the example negotiation flow controller 1060 controls a flow in which requests for bids and corresponding offers are received/transmitted and tracked as is described further below in connection with FIG. 15.

Task Tracking

When an offer is accepted, the example bid negotiator 1040 of the P2P resource sharing controller 1010 notifies the example node operation attestor 1030. The example node operation attestor 1030 can respond to the offer acceptance by signing a blockchain associated with the bid negotiation process and transmit the signed blockchain to the example overlay operation attestor 910 (FIG. 9) of the example overlay manager 850 (FIG. 8 and FIG. 9). The example overlay operation attestor 910 may respond to the signed blockchain by preventing further offers associated with the bid request from being broadcast to the nodes of the overlay. In such examples, the overlay manager 850 will no longer broadcast any new offers made by other nodes/peers and to thereby prevent the resources (including any of the services/functions/algorithms/application/etc.) that are needed to perform the task identified in the request for bids from being performed multiple times by different nodes/peers that make subsequent offers.

In some examples, the offer-accepting node may notify the overlay manager 850 (FIG. 8) when an offer to a bid request has been accepted and the overlay operation attestor 910 of the overlay manager 850 can respond by transmitting a blockchain to be signed by the node operation attestor 1030 of the node 820 when the task associated with the bid has been completed. When signed, the blockchain is returned to the overlay manager 1040 which uses the signed blockchain to track the successful completion of the task and to determine that negotiations regarding the task are at an end. Or, when the task is not successfully completed (e.g., failed), the node operation attestor 1030 may return the blockchain unsigned to signal the failure of the task. The overlay manager 850 can respond to the unsigned block chain by notifying the bid requesting/offer accepting node and by once again broadcasting offers to the nodes of overlay so that the negotiation process can pick up again and continue.

In some examples, when the node/peer that sent the accepted offer is no longer able to successfully perform the task, the node/peer can send an unsigned blockchain back to the overlay manager to signal that additional, new offers can again be broadcast. In some such examples, the example node/peer that can no longer perform the service/function/algorithm can transmit the failure to perform the task to the initiating node/peer as well so that the initiating node/peer can again begin analyzing new offers from others of the nodes/peers included in the overlay. In examples including the overlay operation attestor 910 and the node operation attestor 1030, the initial bid and/or offers associated with the negotiation process nodes may be associated with a block chain at inception. The blockchain can then be used in the manner described above to track the completion of the task and, thus, the completion of the negotiation process for that task.

In some examples, a single node may include both the P2P resource sharing controller and an overlay manager. In some examples, the P2P resource sharing controller is installed in one node (as depicted in FIG. 10) and the overlay manager is installed in another node (as depicted in FIG. 9).

It should be noted that, as used herein a broadcaster refers to a type of transmitter that transmits messages (e.g., containing bid requests or new/counter offers) to multiple nodes/compute nodes of an overlay at a same time. Thus, broadcasting a message refers to transmitting the message to multiple compute nodes of the overlay at the same time. As used herein, a transmitter refers to a device that transmits messages to a single node at a time. Thus, the overlay manager, which includes the broadcaster of bid request/new (counter), receives bid requests and counter-offers from nodes so that the bid requests and counter-offers can be tracked (but not managed) by the overlay manager, and subsequently broadcasts both types of messages to multiple nodes of the overlay. In contrast, a response to a request for bids (e.g. an offer) is transmitted by a node to another node of the overlay that generated the request for bids. Using the broadcast messages and the transmitted messages, the nodes are engaging in a peer-to-peer resource sharing process wherein the overlay manager, instead of managing which of a set of nodes in the overlay will accept which offers and instead of managing which nodes will make requests for bids, merely operates as a conduit for requests for bids and the counter-offers (which amount to a second request for bids) so that such requests for bids and counter-offers can be tracked and execution of any tasks associated with such requests for bids and counter-offers can be tracked. Further, the overlay manager manages the overlay itself (not the bidding process) by allowing or preventing nodes from participating in the overlay based on an ability of such nodes to be properly authenticated. In some examples, the overlay manager may transmit (instead of broadcast bid requests/counter-offers), provided that the use of a transmitter in this manner does not interfere with the aim of the overlay manager which is to track the sharing of resources and control participation in the overlay without managing the bidding process itself.

While an example manner of implementing the example platforms of the three tier network of FIG. 7, of the example devices of FIG. 8, the example overlay manager of FIG. 9, and the example node of FIG. 10 are illustrated in FIGS. 11-18, one or more of the elements, processes and/or devices illustrated in FIGS. 11-18 may be combined, divided, rearranged, omitted, eliminated and/or implemented in any other way. Further, the example IoT platform 710, the example edge platform 720, the example cloud platform 730, the example first node 810, the example second node 820, the example third node 830, the example fourth node 840, the example overlay manager 850, the example first owner/controller device 860, the example second owner/controller device 862, and the example third owner/controller device 864, the example overlay constructor 902, the example overlay de-constructor 904, the example overlay network interface 906, the example resource discoverer and advertiser 907, the example overlay data storage structure 908, the example overlay operation attestor 910, the example node attestor 912, the example operation attestor 914, the example node adder 914, the example first network interface configurer 916 (also referred to herein as the first interface configurer), the example node remover 918, the example second network interface card configurer 920 (also referred to herein as a second interface configurer), the example P2P resource sharing controller 1010, the example overlay inclusion controller 1015, the example overlay removal and addition requestor 1020, the example node attestor responder 1025, the example node operation attestor 1030, the example node and resource data storage structure 1035, the example bid negotiator 1040, the example bid solicitor/requestor 1045, the example offer generator 1050, the example offer acceptor 1055, the example negotiation flow controller 1060, the example bid analyzer 1063, the example overlay interface configure 1065, the example configurable overlay interface 1070, the example bid requestor network interface 1075, the example offer sharing network interface 1080, the example one or more compute resources 1085, the example compute resource controller 1090, and/or, more generally, the example three tier network 700 of FIG. 7, the example devices of FIG. 8, the example overlay manager 850 of FIG. 9 and the example second node 820 of FIG. 8 and FIG. 10 may be implemented by hardware, software, firmware and/or any combination of hardware, software and/or firmware. Thus, for example, any of the example IoT platform 710, the example edge platform 720, the example cloud platform 730, the example first node 810, the example second node 820, the example third node 830, the example fourth node 840, the example overlay manager 850, the example first owner/controller device 860, the example second owner/controller device 862, and the example third owner/controller device 864, the example overlay constructor 902, the example overlay de-constructor 904, the example overlay network interface 906, the example resource discoverer and advertiser 907, the example overlay data storage structure 908, the example overlay operation attestor 910, the example node attestor 912, the example operation attestor 914, the example node adder 914, the example first network interface configurer 916 (also referred to herein as the first interface configurer), the example node remover 918, the example second network interface card configurer 920 (also referred to herein as a second interface configurer), the example P2P resource sharing controller 1010, the example overlay inclusion controller 1015, the example overlay removal and addition requestor 1020, the example node attestor responder 1025, the example node operation attestor 1030, the example node and resource data storage structure 1035, the example bid negotiator 1040, the example bid solicitor/requestor 1045, the example offer generator 1050, the example offer acceptor 1055, the example negotiation flow controller 1060, the example bid analyzer 1063, the example overlay interface configure 1065, the example configurable overlay interface 1070, the example bid requestor network interface 1075, the example offer sharing network interface 1080, the example one or more compute resources 1085, the example compute resource controller 1090, and/or, more generally, the example three tier network 700 of FIG. 7, the example devices of FIG. 8, the example overlay manager 850 of FIG. 9 and the example second node 820 of FIG. 8 and FIG. 10 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example IoT platform 710, the example edge platform 720, the example cloud platform 730, the example first node 810, the example second node 820, the example third node 830, the example fourth node 840, the example overlay manager 850, the example first owner/controller device 860, the example second owner/controller device 862, and the example third owner/controller device 864, the example overlay constructor 902, the example overlay de-constructor 904, the example overlay network interface 906, the example resource discoverer and advertiser 907, the example overlay data storage structure 908, the example overlay operation attestor 910, the example node attestor 912, the example operation attestor 914, the example node adder 914, the example first network interface configurer 916 (also referred to herein as the first interface configurer), the example node remover 918, the example second network interface card configurer 920 (also referred to herein as a second interface configurer), the example P2P resource sharing controller 1010, the example overlay inclusion controller 1015, the example overlay removal and addition requestor 1020, the example node attestor responder 1025, the example node operation attestor 1030, the example node and resource data storage structure 1035, the example bid negotiator 1040, the example bid solicitor/requestor 1045, the example offer generator 1050, the example offer acceptor 1055, the example negotiation flow controller 1060, the example bid analyzer 1063, the example overlay interface configure 1065, the example configurable overlay interface 1070, the example bid requestor network interface 1075, the example offer sharing network interface 1080, the example one or more compute resources 1085, and/or the example compute resource controller 1090 is/are hereby expressly defined to include a non-transitory computer readable storage device or storage disk such as a memory, a digital versatile disk (DVD), a compact disk (CD), a Blu-ray disk, etc. including the software and/or firmware. Further still, the example platforms of the three tier network 700 of FIG. 7, the example devices of FIG. 8, the example overlay 850 of FIG. 9 and the example second node of FIG. 8 and FIG. 10 may include one or more elements, processes and/or devices in addition to, or instead of, those illustrated in FIGS. 11-18, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example platforms of the three tier network 700 of FIG. 7, the example devices of FIG. 8, the example overlay 850 of FIG. 9 and the example second node of FIG. 8 and FIG. 10 are shown in FIGS. 11-18. The machine readable instructions may be one or more executable programs or portion(s) of an executable program for execution by a computer processor and/or processor circuitry, such as the processor 2012 shown in the example processor platform 2000 discussed below in connection with FIG. 20. The program/programs may be embodied in software stored on a non-transitory computer readable storage medium such as a CD-ROM, a floppy disk, a hard drive, a DVD, a Blu-ray disk, or a memory associated with the processor 2012, but the entire program and/or parts thereof could alternatively be executed by a device other than the processor 2012 and/or embodied in firmware or dedicated hardware. Further, although the example programs are described with reference to the flowcharts illustrated in FIGS. 11-18, many other methods of implementing the example platforms of the three tier network 700 of FIG. 7, the example devices of FIG. 8, the example overlay 850 of FIG. 9 and the example second node of FIG. 8 and FIG. 10 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 11-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Node Addition Feature

Figure 11:
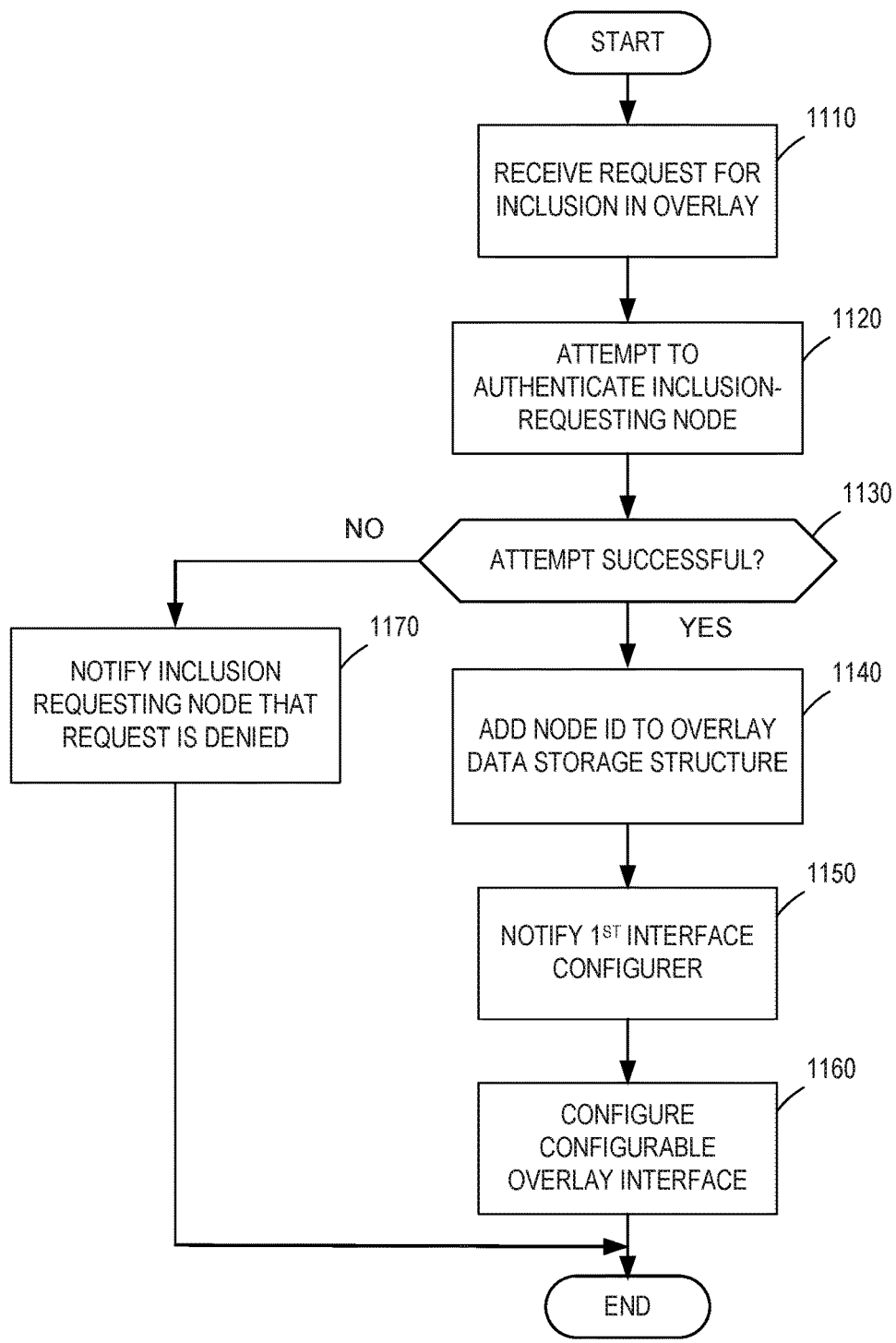
FIG. 11 is a flowchart representative of machine readable instructions which may be executed to implement an example node adding feature of the example overlay manager of FIG. 8 and FIG. 9.

FIG. 11 is a flowchart representative of example machine readable instructions that may be executed to implement an example node adding feature of the overlay manager 850 of FIG. 8 and FIG. 9. The example program 1100 of FIG. 11 begins at a block 1110 at which one of the example nodes (e.g., any of the first node 710, the second node 720, or the third node 730), requests inclusion in an overlay via the example overlay network interface 906. The request is sent to the example node attestor 912 of the example overlay constructor 902. The node attestor 912 responds to the request by using the authentication information (e.g., the RoT) included with the request to attempt to authenticate/certify the identity of the node that is requesting inclusion (block 1120). If the node attestor 912 is not able to authenticate/certify the identity of the node that is requesting inclusion (as determined at block 1130), the node attestor 912 notifies the inclusion-requesting node that the inclusion request has been denied (block 1135) and the process terminates. If the node attestor 912 is able to authenticate/certify the identity of the node requesting inclusion (as determined at block 1130), the node attestor 912 notifies the node adder 914 which, in turn, adds the node identifier (ID) (as well as any other pertinent information) to the example overlay data storage structure 908 (block 1140). In addition, the example node adder 908 notifies the example first interface configurer 916 that the node is to be included in the overlay. Responsive to the notification, the example first interface configurer 916 configures the configurable overlay interface 1070 of the node 820 (see FIG. 10) using a first configuration that allows the node to participate in the peer-to-peer resource bidding process with other nodes included in the overlay (e.g., configuring the bidding network interface of the node serves to register the node as a member of the overlay) (block 1160). After the configurable overlay interface has been configured to enable participation in the peer-to-peer resource bidding program, the program terminates but may be re-executed upon, for example, subsequent receipt of a request for inclusion in an overlay.

Peer-To-Peer Resource Advertiser and Discoverer Feature

Figure 12:
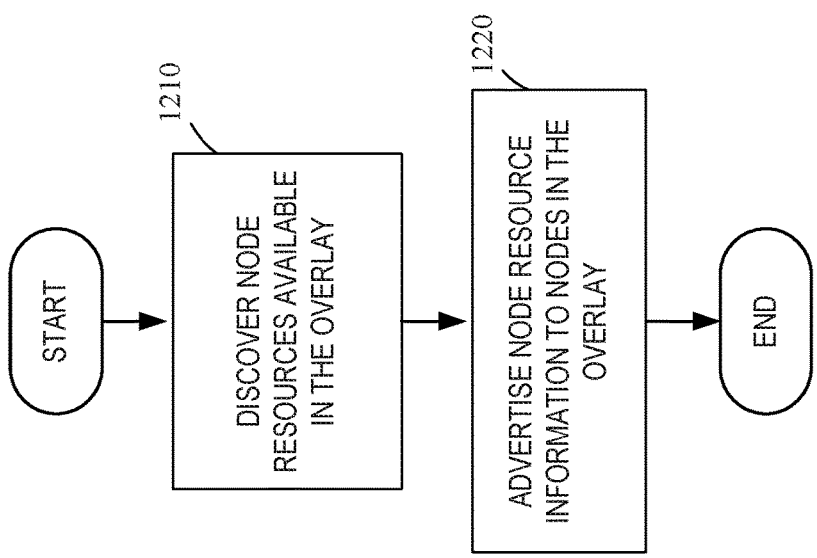
FIG. 12 is a flowchart representative of machine readable instructions which may be executed to implement an example peer-to-peer (P2P) resource advertiser and discoverer feature of the fourth node of FIG. 9.

FIG. 12 is a flowchart representative of example machine readable instructions that may be executed to implement the P2P resource advertisement logic and discovery feature. In some examples, the program begins at a block 1210 at which one or more P2P resource advertiser and discoverers 907 of one or more nodes of an overlay that includes nodes associated with different edge platforms discovers information about resources (that can include services/functions/algorithms/applications/etc.) that are available at ones of the nodes on ones of the edge platforms and that are available to others of the nodes associated with the same and with other edge platforms included in the overlay (block 1210). In some examples, the resource availability information discovered by the P2P resource advertiser and discoverers 907 can include the availability of particular types of compute resources as well as the performance capacity of such compute resources. In addition, the P2P resource advertiser and discoverers 907 broadcasts/advertises the resource information associated with ones of the nodes to others of the nodes included in the overlay (block 1220). The program is then terminated but can be repeated each time a new node is added (or removed) to/from the overlay, at periodic or aperiodic intervals or as resource availability reported by one or more P2P resource advertiser and discoverers 907 of the one or more nodes of the one or more of the edge platforms.

Removing a Node from an Overlay

Figure 13:
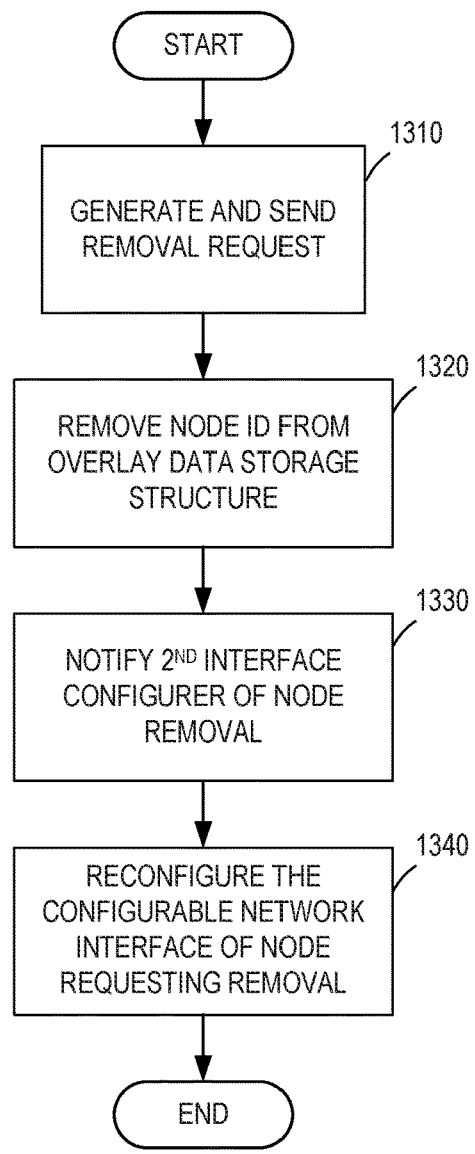
FIG. 13 is a flowchart representative of machine readable instructions which may be executed to implement an example node removal feature of the example overlay manager of FIG. 8 and FIG. 9.

FIG. 13 is a flowchart representative of example machine readable instructions that may be executed to implement the node removal feature of the overlay manager 850 (FIG. 8 and FIG. 9). The program begins at a block 1310 at which a request to remove a node is received from an example node to be removed. In some examples, the request is received from the fourth node 840 (FIG. 4) and is received at the overlay network interface 906 of the overlay manager 850 (FIG. 8 and FIG. 9). The request can include information such as an owner/controller entity identifier, a node identifier that uniquely identifies the node making the removal request, an identifier of the overlay from which the node is requesting removal, etc. Responsive to the request, the example node remover 918 removes (or causes the removal of) the node identifying information from the overlay data storage structure 908 (block 1320). In some examples, the node remover 918 also notifies the second interface configurer 920 of the removal request (block 1330). In response, the second configurer 920 re-configures the configurable network interface 1070 of the node making the removal request (block 1340) to a second configuration. The re-configuration (to the second configuration) of the configurable network interface 1070 of the node requesting removal, prevents that node from further participation in the overlay. Thus, as a result of the reconfiguring by the second interface configurer 920 and the node remover 918, the removed node is prevented from further participation in resource sharing with the other nodes of the overlay using the peer-to-peer resource bidding process disclosed herein. Thereafter, the node removal program ends.

Overlay Operation Attestation Feature

Figure 14:
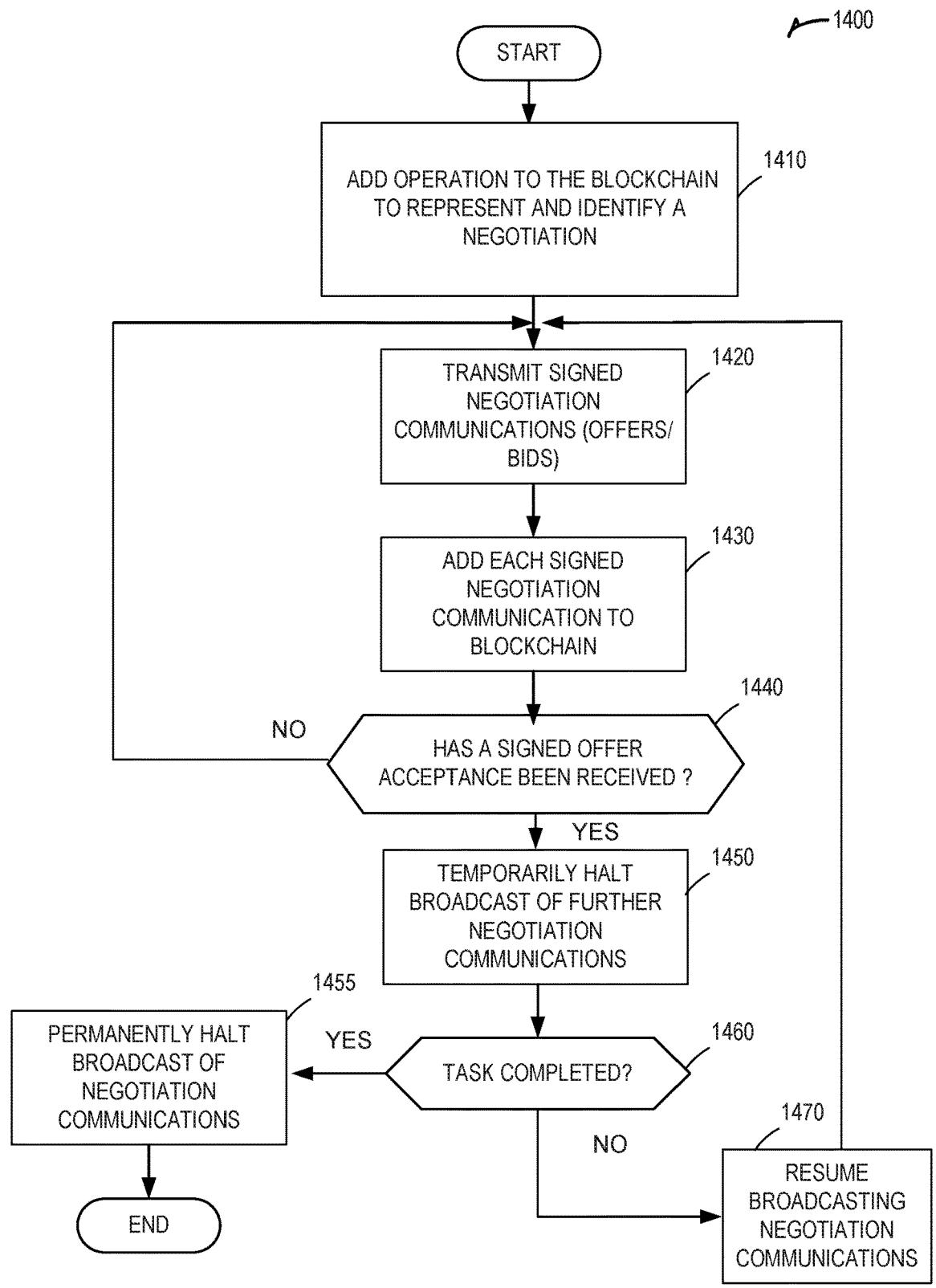
FIG. 14 is a flowchart representative of machine readable instructions which may be executed to implement an example an overlay operation attestation feature of the example overlay manager of FIG. 8 and FIG. 9.

FIG. 14 is a flowchart representative of example machine readable instructions that may be executed to implement the overlay operation attestation feature of the overlay manager. The program 1400 begins at a block 1410 at which the example overlay operation attestor 910 of the overlay manager 850 generate a blockchain operation to be used to track/trace bidding and resource sharing operations associated with a bidding negotiation occurring between nodes in the overlay as well as to track the performance (or not) of a task associated with the communications. In some examples, the blockchain acts as the distributed ledgering of successfully and unsuccessfully performed tasks. In some such examples, tasks performed or unsuccessfully attempted are added to the blockchain. In some examples, the blockchain operation is transmitted with each or some of the negotiation communications (e.g., new offers/requests for bids broadcast by the new offer/bid request broadcaster 925) and with negotiations exchanged between negotiating nodes (e.g., first, second, third offers, etc.) (block 1420). In some examples, a network fabric interface of each node included in the overlay can include an accelerated logic to sign the blockchain associated with each of the communications (e.g., bids/offers) of a negotiation process (block 1430). When an accepted offer is received at the overlay manager (as determined at block 1440), the overlay manager 850 can halt (at least temporarily) broadcast of further communications from other nodes regarding the negotiation (block 1450). When a signed blockchain associated with an accepted offer is not received within a threshold amount of time (as determined at block 1440), the program 1400 returns to the block 1420 and blocks subsequent thereto. When a signed blockchain associated with a completed task of a negotiation is received (as determined at the block 1460), the bid/offer broadcaster 1425 permanently halts the broadcast of negotiations regarding the completed task (block 1455) and the program ends. When a notification that a task has failed is received (as determined at block 1460), the bid request/offer broadcaster 925 resumes broadcasting negotiation messages regarding the failed task (block 1470). The program 1400 then returns to block 1420 and blocks subsequent thereto until a task associated with the negotiations has been completed at which time the program 1400 ends.

In some examples, when the node/peer that sent the accepted offer is no longer able to successfully perform the task, the node/peer can send an unsigned blockchain back to the overlay manager to signal that additional, new offers can again be broadcast. In some such examples, the example node/peer that can no longer perform the service/function/algorithm can transmit the failure to perform the task to the initiating node/peer as well so that the initiating node/peer can again begin analyzing new offers from others of the nodes/peers included in the overlay.

Node Compute Resource Sharing Via a Bid Negotiation Process

Figure 15:
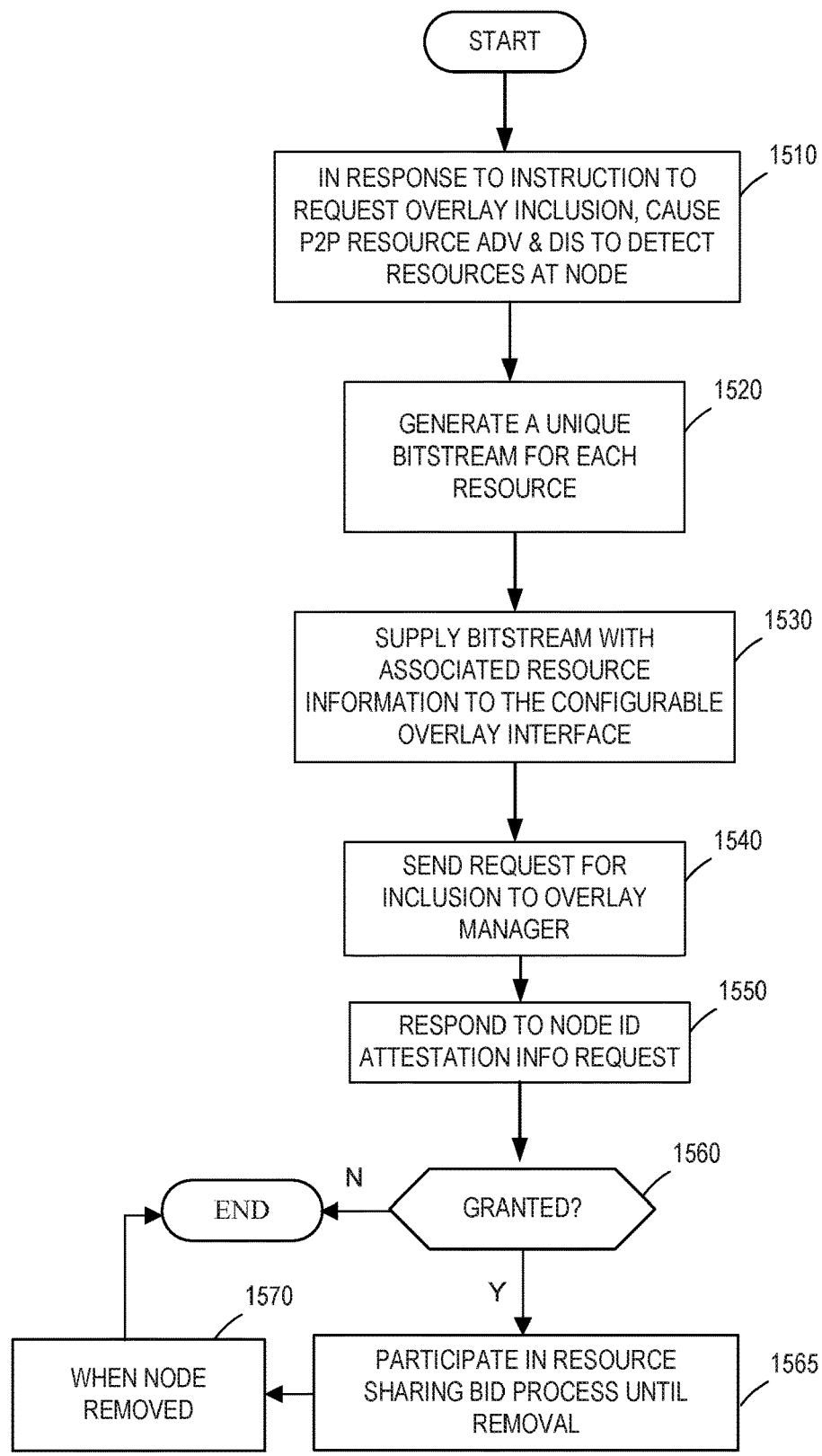
FIG. 15 is a flowchart representative of machine readable instructions which may be executed to implement a node-adding feature of a node (e.g., the fourth node) of FIG. 10.

FIG. 15 is a flowchart representative of example machine readable instructions that may be executed to implement a node addition feature that includes configuring a node for inclusion in the overlay. The program begins at a block 1510 at which the example overlay interface configurer 1065 of the example P2P resource sharing controller 1010 responds to an instruction to include the node (e.g., the second node 820) in an overlay (or an instruction for the node to request inclusion in the overlay). The instruction can be received from an owner/controller device (e.g., the second owner/controller device 862). The overlay interface configurer 1065 can respond to the instruction by causing the P2P resource advertiser and discoverer 907 to detect the nature (e.g., the type, quantity, attributes thereof, etc.) of the resources 1085 available at the node 820. The overlay interface configurer 1065 then generates a unique bitstream to be associated with each (or some) of the resources (including the services/functions/algorithms/applications/ etc.) implemented by the node 820 (block 1520). In some examples, the overlay interface configurer 1065 supplies the configurable overlay interface 1070 with the unique bitstreams and information identifying the corresponding ones of the resources including the corresponding ones of the services/functions/algorithms/applications/etc., (block 1530). Assuming inclusion in the overlay is granted by the overlay manager (as described above with respect to FIG. 11, the configurable overlay interface 1070 can then use a unique bitstream corresponding to a unique one of the resources including the services/functions/algorithms/applications/etc. when communicating with the overlay manager 850 (FIG. 8) (or with another of the first and/or third nodes 810, 830) about the unique one of the resources including the services/functions/algorithms/applications/etc.

In some examples, after or before the overlay interface configurer 1065 operates to configure the configurable overlay interface 1070, the example overlay removal and addition requestor 1020 of the example overlay inclusion controller 1015 can generate a request for inclusion in the overlay (block 1540). In some examples, the request is generated in response to a signal or instruction from the one of the first, second or third owner/controller devices 860, 862, 864 (FIG. 8) that is associated with an owner of the node 820. In some examples, the generated request can be transmitted by the configurable overlay interface 1070 of the second node 820 to the overlay manager 850 of the fourth node 840.

In some examples, in response to the request for inclusion by the second node 820, the node attestor responder 1025 responds to an authentication process conducted by the node attestor 912 (FIG. 9) of the overlay manager 850 to authenticate the identity of the second node 820 (block 1550). When a request to join an overlay is granted by the overlay manager 850 (FIG. 8), (as determined at block 1560), the example overlay inclusion controller 1020 of the overlay manager (FIG. 10) can be informed of the inclusion via, for example, the configurable overlay interface 1070, as described with respect to FIG. 11. In some examples, the second node 820, once granted inclusion in to the overlay, continues to operate within the overlay (block 1565) until the second node 820 is removed (block 1570). The P2P resource advertiser and discoverer 907 of the newly included node (e.g., the second node 820) (FIG. 8 and FIG. 9) can then operate to discover any information needed about the resources/services/functions/algorithm etc. available at the second node 820 and can advertise the information to the overlay manager and/or to other nodes of the overlay. When the request to join the overlay is denied (as determined at block 1560) (e.g., the overlay manager 850 rejected the request), the program ends as described above with respect to FIG. 11.

Generating an Offer in Response to a Request for Bid

Figure 16:
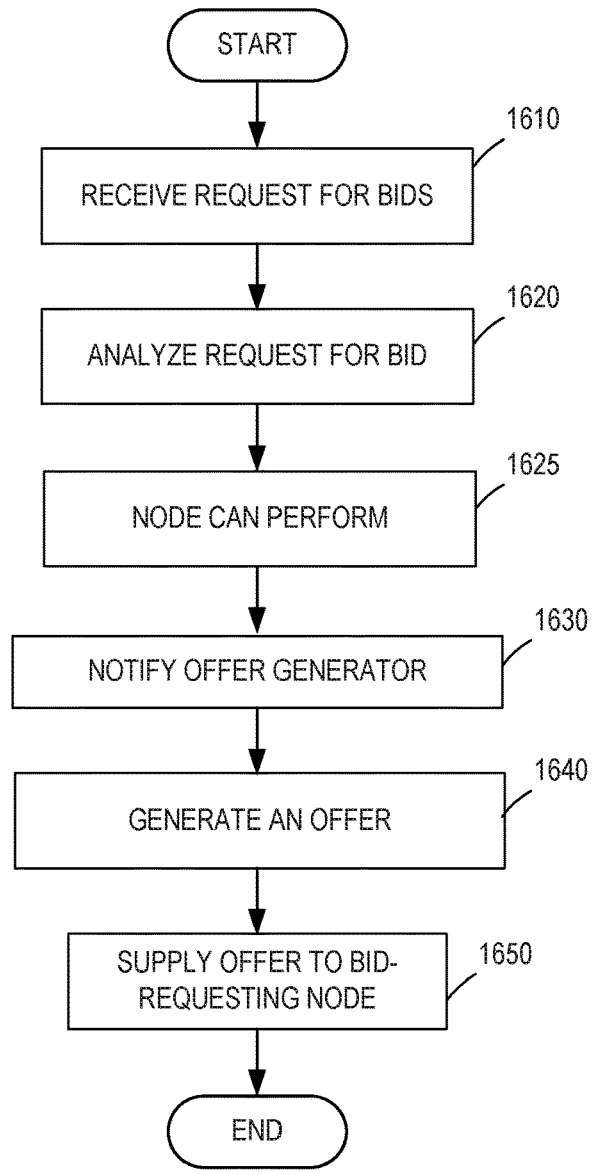
FIG. 16 is a flowchart representative of machine readable instructions which may be executed to implement an offer-making feature of the node of FIG. 10.

FIG. 16 is a flowchart representative of example machine readable instructions that may be executed to implement an offer generating feature of the node. The program 1600 can begin at a block 1610 at which a request for bids is received at the example offer sharing network interface 1080 of the second node 820. In some examples, the example bid analyzer 1063 of the example bid negotiator 1040 analyzes the incoming request for bid to: 1) identify a task that will require usage of the resources 1090 including one or more of the services/functions/algorithms/applications/etc., 2) determine whether the bid request can be performed by the node, and, if so, 3) to determine whether the task can be performed according to the terms (e.g., of the service level agreement, the accuracy, the speed, etc.) included in the bid request (block 1620). When the bid analyzer 1063 determines that the node can perform/execute a task (e.g., has the resources requested via the bid, etc.) associated with the incoming request for bid (as determined at block 1625), the bid analyzer 1036 can notify the offer generator 1050 (block 1630) which responds by generating an offer to perform the requested task identified in accordance with the terms included in the bid request (or using a different set of terms) (block 1640). In some such examples, the offer generator 1050 can supply the offer to the offer sharing network interface 1080 for subsequent transmission to the bid-requesting node (block 1650). In some examples, the offer sharing network interface 1080 can be configured to transmit the offer using a bit stream defined (or identified) by the overlay interface configurer for the particular task to be performed/executed in connection with the offer. Thereafter, the program 1600 to implement the offer-generating feature of the node terminates.

Responding to a New Offer

Figure 17:
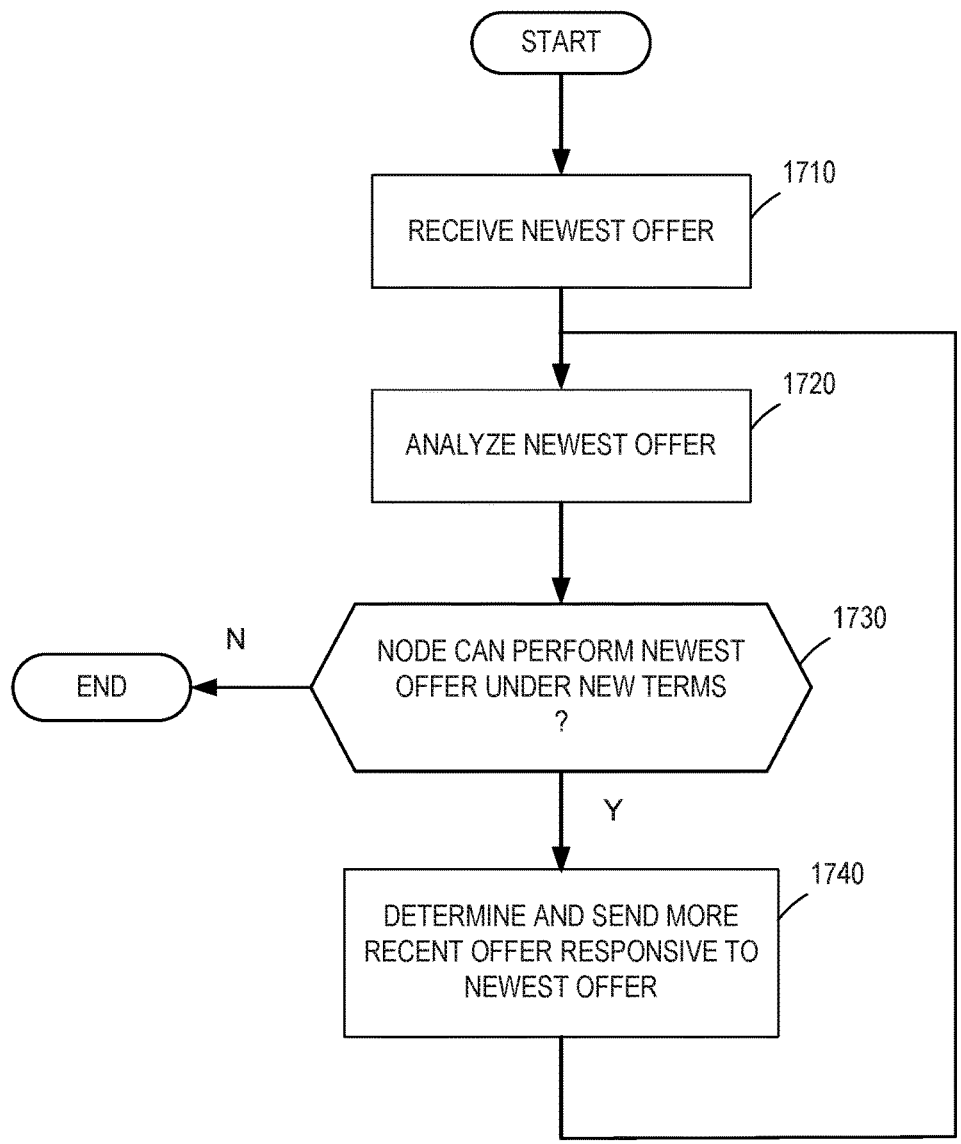
FIG. 17 is a flowchart representative of machine readable instructions which may be executed to implement a feature to generate a new offer responsive to a first offer of the node of FIG. 10.

FIG. 17 is a flowchart representative of example machine readable instructions that may be executed to implement a second offer-generating feature of the node. The program begins at a block 1710 at which the offer-making peer/node, after making a first offer, receives a new offer at the offer sharing network interface 1080. When the new offer is received at the node/peer, the bid analyzer can analyze the new offer (block 1720) and determine whether the node/peer has sufficient resources to perform the task associated with the new offer at the terms identified in the new offer (block 1730). If not, the offer-making peer/node can respond to the new offer by doing nothing and the program 1700 ends, or the node/peer can determine (at block 1730) that the offer-making peer/node will respond to the new offer by making a second offer that is the same or is more competitive than the new offer (block 1730). In some such examples, the bid analyzer 1063 and offer generator 1050 of the bid negotiator 1040 again work together determine a second offer (more recent offer) responsive to the newest offer (block 1740). Thereafter, the program 1700 for responding to a new offer is terminated.

It should be understood that the second offer is transmitted by the offer sharing network interface to the bid initiator which can respond by generating yet another new offer. In examples in which yet another new offer, the bid negotiator again works to determine whether to respond, and if so, to determine the terms of and to generate a third offer to be sent to the bid initiator. This back and forth bidding process can continue in the manner described until either a latest offer made by the offering node/peer has been accepted (by the offer acceptor 1055 (FIG. 10)) or until an offer made by another of the nodes/peers has been accepted by the bid-initiating node.

Making a Request for Bids

Figure 18:
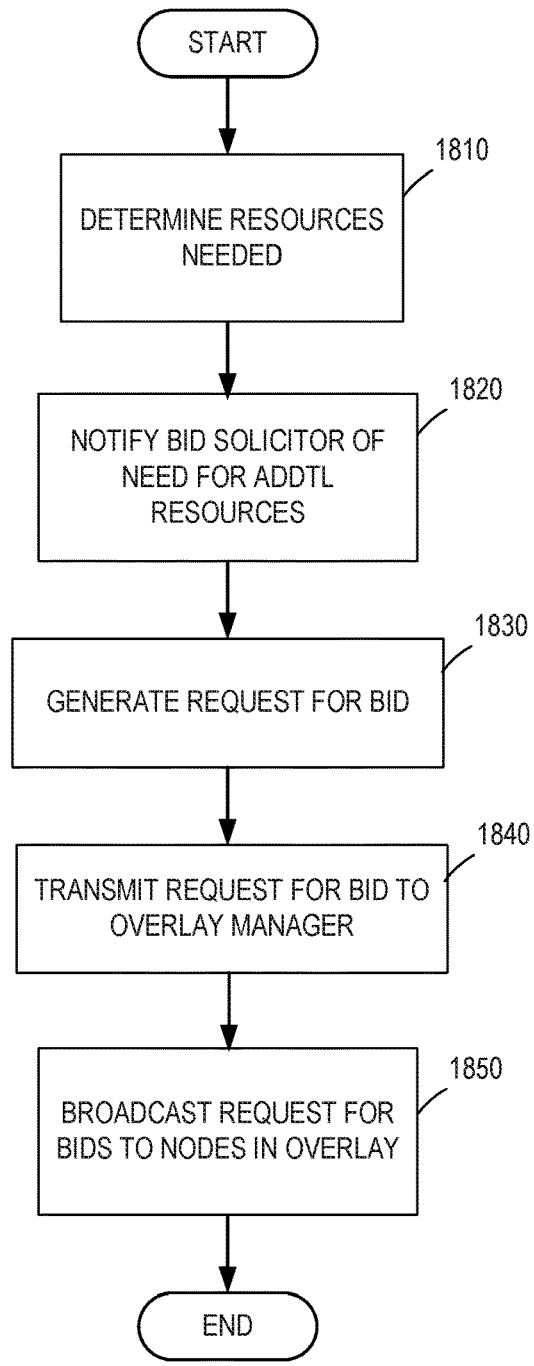
FIG. 18 is a flowchart representative of machine readable instructions which may be executed to implement a request for bid generating feature of the node of FIG. 10.

FIG. 18 is a flowchart representative of example machine readable instructions that may be executed to implement a bid requesting feature of the node. The program 1800 begins at a block 1810 when the example resource controller 1090 of the node making the request for bids (e.g., the second node 820 (FIG. 8 and FIG. 9)) determines that resources (additional to its own resources 1085) are needed to complete a task. In some such examples, the resource controller 1090 notifies the example bid solicitor 1045 of the example bid negotiator 1045 (block 1820), and, in response, the bid solicitor generates a request for the additional, needed resources (block 1830). In some examples, the request for bid is transmitted by the bid requestor network interface 1075 to the bid request/offer broadcaster 925 of the overlay manager 850 (FIG. 8 and FIG. 9) (block 1840) which broadcasts the bid request to the other nodes/peers included in the overlay (block 1850). Thereafter, the bid requesting program 1800 terminates.

Communication Message Sequence

Figure 19:
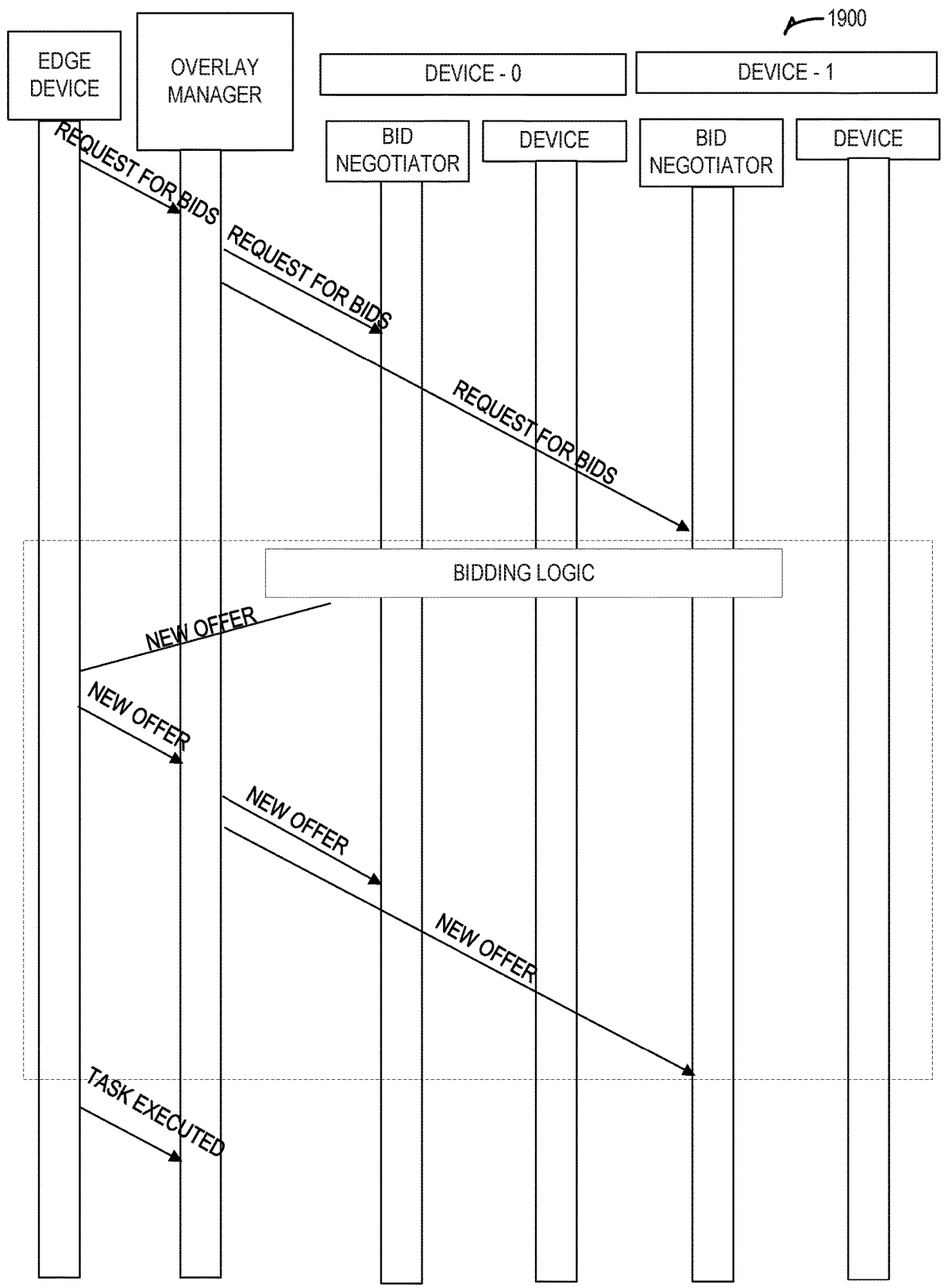
FIG. 19 is a message sequence diagram that illustrates a sequence of bid negotiation messages between the nodes of FIG. 8 and the overlay manager of FIG. 8.

FIG. 19 is a communication message sequence diagram (also known as a ladder diagram). FIG. 19 depicts the flow of messages during an example bidding negotiation process. In the example bidding negotiation process 1900, an edge device transmits a request for bids to the example overlay manager 850 of FIG. 8. In some examples, the edge device of FIG. 19 is a bid initiation device/node. In some examples, all communication generated by the bid initiating device/node are transmitted to the overlay manager 850. The overlay manager responds to the request for bids by broadcasting the request for bids all (or a subset of all) of nodes of the three tier network 700 (FIG. 7). In some examples, the request for bids broadcast by the overlay manager are configured to be delivered to the P2P resource sharing controller of each of the nodes/devices. The bid negotiator of the respective P2P resource sharing controllers of the respective ones of the nodes/devices either determines (as described above) that an example first offer is to be communicated to the bid initiator, or that a first offer is not to be communicated to the bid initiator. In the event that a node/device determines that a first offer is to be made, the bid negotiator of the node/device causes the first offer to be communicated to the example bid initiator. The bid initiator, in the example sequence of FIG. 19 can respond by a transmitting a second offer (or by transmitting the first offer) (referred to herein as a new offer) to the overlay manager. The overlay manager, as described above, broadcasts the new offer to the bid negotiator of some of all of the devices/node which again determine whether to send a second offer or not. In some examples, the bid-initiator node/device accepts a bid and, when the task that is the subject of the bid is completed by the node/device that made the accepted bid, the bid initiator notifies the overlay manager. Thus, The bid negotiation process implemented by the P2P resource sharing controllers of each of the nodes/devices are responsible for the bid negotiation process such that the process is a peer-to-peer resource sharing process, while the overlay manager is responsible for 1) determining which nodes are included and/or excluded from the overlay, 2) broadcasting requests for bids and new offers generated by bid initiating devices/nodes of the overlay. The P2P resource sharing controller determines when a task that is subject of a request for bids has been concluded so that further broadcasts regarding the associated bidding process are halted.

Figure 20A:
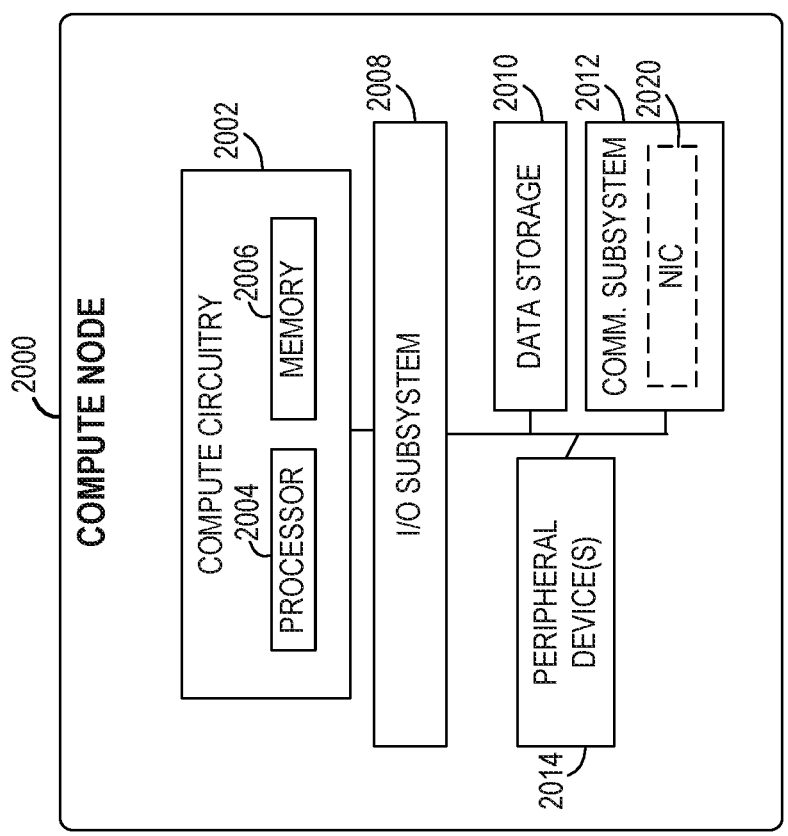
FIG. 20A is a block diagram of an example implementation of an example compute node that may be deployed in one of the edge computing systems illustrated in FIGS. 1-4 and/or 6.

FIG. 20A is a block diagram of an example implementation of an example edge compute node 2000 that includes a compute engine (also referred to herein as "compute circuitry") 2002, an input/output (I/O) subsystem 2008, data storage 2010, a communication circuitry subsystem 2012, and, optionally, one or more peripheral devices 2014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 2000 of FIG. 20 may be deployed in one of the edge computing systems illustrated in FIGS. 1-4 and/or 6 to implement any edge compute node of FIGS. 1-4 and/or 6.

The compute node 2000 may be embodied as any type of engine, device, or collection of devices capable of performing various compute functions. In some examples, the compute node 2000 may be embodied as a single device such as an integrated circuit, an embedded system, a field-programmable gate array (FPGA), a system-on-a-chip (SOC), or other integrated system or device. In the illustrative example, the compute node 2000 includes or is embodied as a processor 2004 and a memory 2006. The processor 2006 may be embodied as any type of processor capable of performing the functions described herein (e.g., executing an application). For example, the processor 2004 may be embodied as a multi-core processor(s), a microcontroller, a processing unit, a specialized or special purpose processing unit, or other processor or processing/controlling circuit.

In some examples, the processor 2004 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 2004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 2004 may work in coordination with each other to execute many types of operations and instructions within and on behalf of the compute node 2000.

The memory 2006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 2006 may be integrated into the processor 2004. The memory 2006 may store various software and data used during operation such as one or more applications, data operated on by the application(s), libraries, and drivers.

The compute circuitry 2002 is communicatively coupled to other components of the compute node 2000 via the I/O subsystem 2008, which may be embodied as circuitry and/or components to facilitate input/output operations with the compute circuitry 2002 (e.g., with the processor 2004 and/or the main memory 2006) and other components of the compute circuitry 2002. For example, the I/O subsystem 2008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2008 may form a portion of a system-on-a-chip (SoC) and be incorporated, along with one or more of the processor 2004, the memory 2006, and other components of the compute circuitry 2002, into the compute circuitry 2002.

The one or more illustrative data storage devices 2010 may be embodied as any type of devices configured for short-term or long-term storage of data such as, for example, memory devices and circuits, memory cards, hard disk drives, solid-state drives, or other data storage devices. Individual data storage devices 2010 may include a system partition that stores data and firmware code for the data storage device 2010. Individual data storage devices 2010 may also include one or more operating system partitions that store data files and executables for operating systems depending on, for example, the type of compute node 2000.

The communication circuitry 2012 may be embodied as any communication circuit, device, or collection thereof, capable of enabling communications over a network between the compute circuitry 2002 and another compute device (e.g., an edge gateway of an implementing edge computing system). The communication circuitry 2012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 2012 includes a network interface controller (NIC) 2020, which may also be referred to as a host fabric interface (HFI). The NIC 2020 may be embodied as one or more add-in-boards, daughter cards, network interface cards, controller chips, chipsets, or other devices that may be used by the compute node 2000 to connect with another compute device (e.g., an edge gateway node). In some examples, the NIC 2020 may be embodied as part of a system-on-a-chip (SoC) that includes one or more processors, or included on a multichip package that also contains one or more processors. In some examples, the NIC 2020 may include a local processor (not shown) and/or a local memory (not shown) that are both local to the NIC 2020. In such examples, the local processor of the NIC 2020 may be capable of performing one or more of the functions of the compute circuitry 2002 described herein. Additionally, or alternatively, in such examples, the local memory of the NIC 2020 may be integrated into one or more components of the client compute node at the board level, socket level, chip level, and/or other levels.

Additionally, in some examples, a respective compute node 2000 may include one or more peripheral devices 2014. Such peripheral devices 2014 may include any type of peripheral device found in a compute device or server such as audio input devices, a display, other input/output devices, interface devices, and/or other peripheral devices, depending on the particular type of the compute node 2000. In further examples, the compute node 2000 may be embodied by a respective edge compute node (whether a client, gateway, or aggregation node) in an edge computing system or like forms of appliances, computers, subsystems, circuitry, or other components.

Figure 20B:
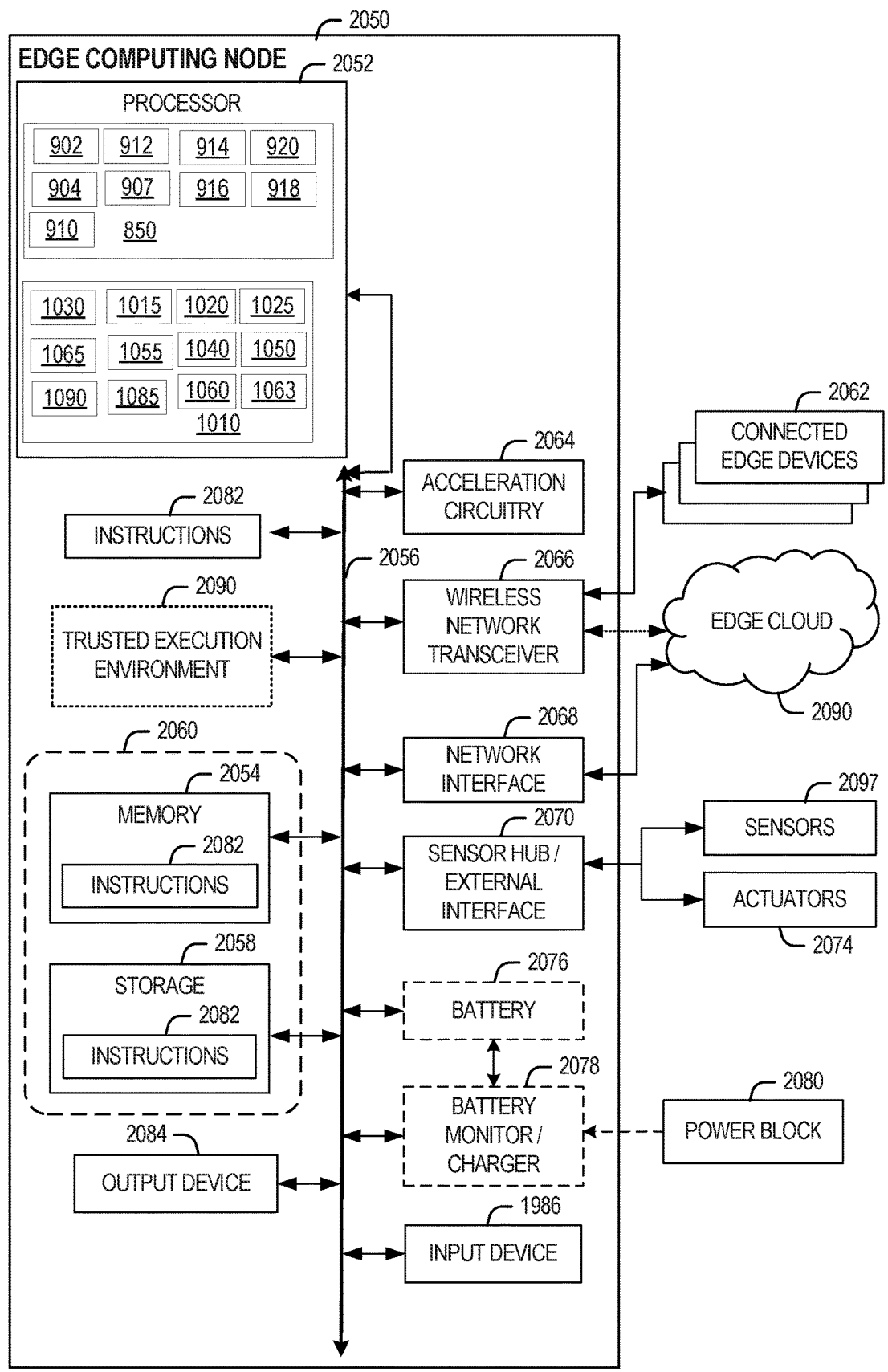
FIG. 20B is another block diagram of an example implementation of an example compute node that may be deployed in one of the edge computing systems illustrated in FIGS. 1-4 and/or 6.

In a more detailed example, FIG. 20B illustrates a block diagram of an example edge computing node 2050 structured to execute the instructions of FIGS. 11-18 to implement the techniques (e.g., operations, processes, methods, and methodologies) described herein such as the overlay manager and the P2P resource sharing controller of FIG. 8, FIG. 9 and FIG. 10. This edge computing node 2050 provides a closer view of the respective components of node 2000 when implemented as or as part of a computing device (e.g., as a mobile device, a base station, server, gateway, etc.). The edge computing node 2050 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 2050, or as components otherwise incorporated within a chassis of a larger system. For example, the edge computing node 2050 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 2050 may include processing circuitry in the form of a processor 2052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 2052 may be a part of a system on a chip (SoC) in which the processor 2052 and other components are formed into a single integrated circuit, or a single package, such as the Edison™ or Galileo™ SoC boards from Intel Corporation, Santa Clara, California. As an example, the processor 2052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 2052 and accompanying circuitry may be provided in a single socket form factor, multiple socket form factor, or a variety of other formats, including in limited hardware configurations or configurations that include fewer than all elements shown in FIG. 20B. In this example, the processor implements the fourth node 840 having both an overlay manager 850 and a P2P resource sharing controller 1010, the processor 2112 implements the example overlay manager 850, the example overlay constructor 902, the example overlay de-constructor 904, the example overlay network interface 906, the example resource discoverer and advertiser 907, the example overlay operation attestor 910, the example node attestor 912, the example node adder 914, the example first network interface configurer 916 (also referred to herein as the first interface configurer), the example node remover 918, the example second network interface card configurer 920 (also referred to herein as a second interface configurer), the example P2P resource sharing controller 1010, the example overlay inclusion controller 1015, the example overlay removal and addition requestor 1020, the example node attestor responder 1025, the example node operation attestor 1030, the example bid negotiator 1040, the example bid solicitor/requestor 1045, the example offer generator 1050, the example offer acceptor 1055, the example negotiation flow controller 1060, the example bid analyzer 1063, the example overlay interface configurer 1065, the example one or more compute resources 1085, and the example compute resource controller 1090.

The processor 2052 may communicate with a system memory 2054 over an interconnect 2056 (e.g., a bus). Any number of memory devices may be used to provide for a given amount of system memory. As examples, the memory 2054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2058 may also couple to the processor 2052 via the interconnect 2056. In an example, the storage 2058 may be implemented via a solid-state disk drive (SSDD). Other devices that may be used for the storage 2058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2058 may be on-die memory or registers associated with the processor 2052. However, in some examples, the storage 2058 may be implemented using a micro hard disk drive (HDD). Further, any number of new technologies may be used for the storage 2058 in addition to, or instead of, the technologies described, such resistance change memories, phase change memories, holographic memories, or chemical memories, among others.

The components may communicate over the interconnect 2056. The interconnect 2056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 2056 may couple the processor 2052 to a transceiver 2066, for communications with the connected edge devices 2062. The transceiver 2066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2066 (or multiple transceivers) may communicate using multiple standards or radios for communications at a different range. For example, the edge computing node 2050 may communicate with close devices, e.g., within about 10 meters, using a local transceiver based on Bluetooth Low Energy (BLE), or another low power radio, to save power. More distant connected edge devices 2062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2066 (e.g., a radio transceiver) may be included to communicate with devices or services in the edge cloud 2095 via local or wide area network protocols. The wireless network transceiver 2066 may be a low-power wide-area (LPWA) transceiver that follows the IEEE 802.15.4, or IEEE 802.15.4g standards, among others. The edge computing node 2050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2066, as described herein. For example, the transceiver 2066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2068 may be included to provide a wired communication to nodes of the edge cloud 2095 or to other devices, such as the connected edge devices 2062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2068 may be included to enable connecting to a second network, for example, a first NIC 2068 providing communications to the cloud over Ethernet, and a second NIC 2068 providing communications to other devices over another type of network.

Given the variety of types of applicable communications from the device to another component or network, applicable communications circuitry used by the device may include or be embodied by any one or more of components 2064, 2066, 2068, or 2070. Accordingly, in various examples, applicable means for communicating (e.g., receiving, transmitting, etc.) may be embodied by such communications circuitry.

The edge computing node 2050 may include or be coupled to acceleration circuitry 2064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 2056 may couple the processor 2052 to a sensor hub or external interface 2070 that is used to connect additional devices or subsystems. The devices may include sensors 2072, such as accelerometers, level sensors, flow sensors, optical light sensors, camera sensors, temperature sensors, global navigation system (e.g., GPS) sensors, pressure sensors, barometric pressure sensors, and the like. The hub or interface 2070 further may be used to connect the edge computing node 2050 to actuators 2074, such as power switches, valve actuators, an audible sound generator, a visual warning device, and the like.

In some optional examples, various input/output (I/O) devices may be present within or connected to, the edge computing node 2050. For example, a display or other output device 2084 may be included to show information, such as sensor readings or actuator position. An input device 2086, such as a touch screen or keypad may be included to accept input. An output device 2084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 2050. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2076 may power the edge computing node 2050, although, in examples in which the edge computing node 2050 is mounted in a fixed location, it may have a power supply coupled to an electrical grid, or the battery may be used as a backup or for temporary capabilities. The battery 2076 may be a lithium ion battery, or a metal-air battery, such as a zinc-air battery, an aluminum-air battery, a lithium-air battery, and the like.

A battery monitor/charger 2078 may be included in the edge computing node 2050 to track the state of charge (SoCh) of the battery 2076, if included. The battery monitor/charger 2078 may be used to monitor other parameters of the battery 2076 to provide failure predictions, such as the state of health (SoH) and the state of function (SoF) of the battery 2076. The battery monitor/charger 2078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2078 may communicate the information on the battery 2076 to the processor 2052 over the interconnect 2056. The battery monitor/charger 2078 may also include an analog-to-digital (ADC) converter that enables the processor 2052 to directly monitor the voltage of the battery 2076 or the current flow from the battery 2076. The battery parameters may be used to determine actions that the edge computing node 2050 may perform, such as transmission frequency, mesh network operation, sensing frequency, and the like.

A power block 2080, or other power supply coupled to a grid, may be coupled with the battery monitor/charger 2078 to charge the battery 2076. In some examples, the power block 2080 may be replaced with a wireless power receiver to obtain the power wirelessly, for example, through a loop antenna in the edge computing node 2050. A wireless battery charging circuit, such as an LTC4020 chip from Linear Technologies of Milpitas, California, among others, may be included in the battery monitor/charger 2078. The specific charging circuits may be selected based on the size of the battery 2076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2058 may include instructions 2082 in the form of software, firmware, or hardware commands to implement the techniques described herein. Although such instructions 2082 are shown as code blocks included in the memory 2054 and the storage 2058, it may be understood that any of the code blocks may be replaced with hardwired circuits, for example, built into an application specific integrated circuit (ASIC).

In an example, the instructions 2082 provided via the memory 2054, the storage 2058, or the processor 2052 may be embodied as a non-transitory, machine-readable medium 2060 including code to direct the processor 2052 to perform electronic operations in the edge computing node 2050. The processor 2052 may access the non-transitory, machine-readable medium 2060 over the interconnect 2056. For instance, the non-transitory, machine-readable medium 2060 may be embodied by devices described for the storage 2058 or may include specific storage units such as optical disks, flash drives, or any number of other hardware devices. The non-transitory, machine-readable medium 2060 may include instructions to direct the processor 2052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 2082 on the processor 2052 (separately, or in combination with the instructions 2082 of the machine readable medium 2060) may configure execution or operation of a trusted execution environment (TEE) 2090. In an example, the TEE 2090 operates as a protected area accessible to the processor 2052 for secure execution of instructions and secure access to data. Various implementations of the TEE 2090, and an accompanying secure area in the processor 2052 or the memory 2054 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 2050 through the TEE 2090 and the processor 2052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 2132 of FIGS. 11-18 may be stored in the mass storage device 2128, in the volatile memory 2114, in the non-volatile memory 1016, and/or on a removable non-transitory computer readable storage medium such as a CD or DVD.

Figure 21:
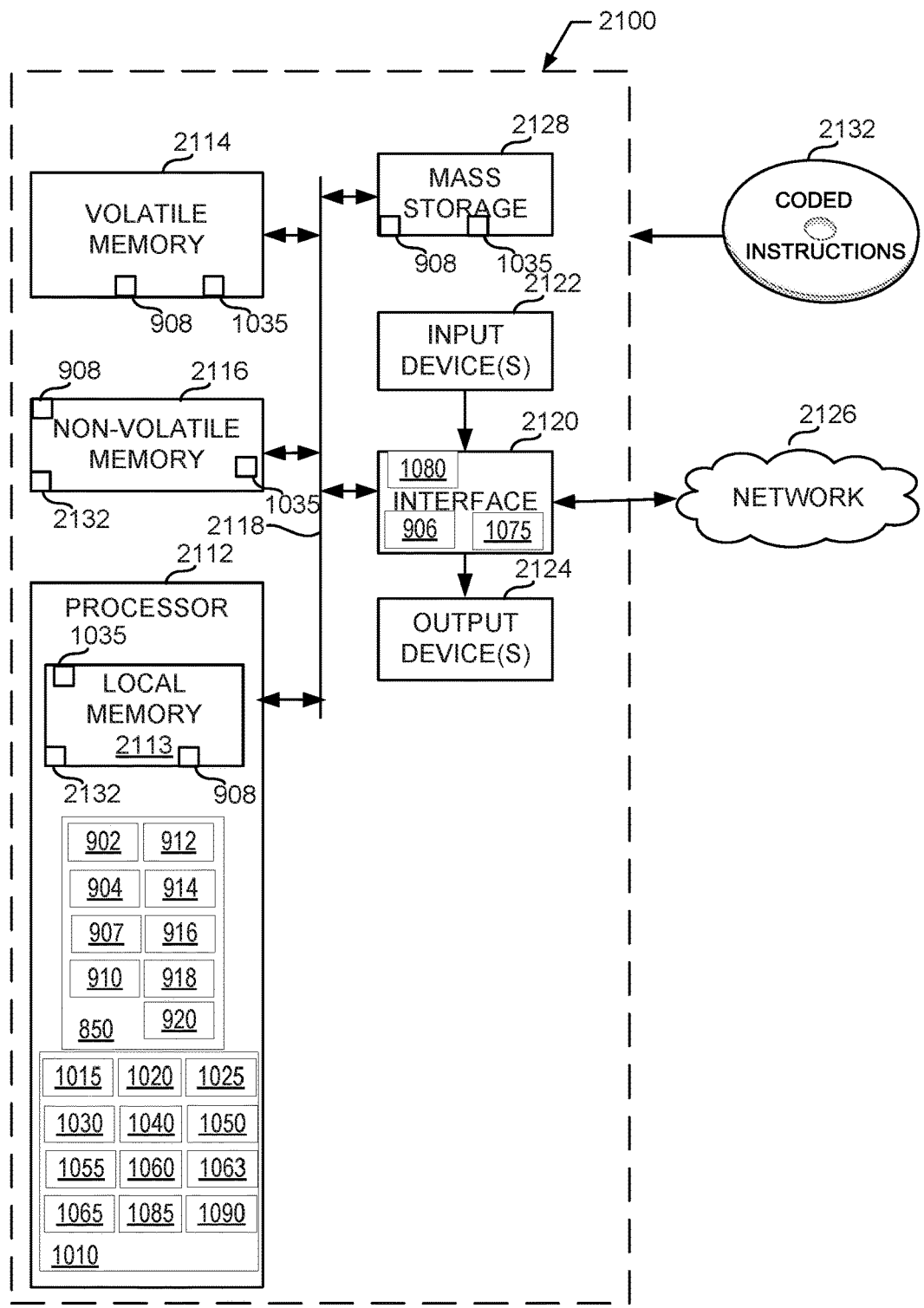
FIG. 21 is a block diagram of an example implementation of an example node having an overlay manager and a P2P resource sharing controller.

FIG. 21 is a block diagram of an example processor platform 2100 structured to execute the instructions of FIGS. 11-18 to implement the overlay manager 850, and the P2P resource sharing controller of the second node 820 of FIGS. 8, 9 and 10. Although in FIG. 8, FIG. 9 and FIG. 10, the fourth node 840 is illustrated as having the overlay manager and the second node 820 is illustrated as having the P2P resource sharing controller 1040, in some examples, all (or several) of the devices/nodes of FIG. 7 and FIG. 8 include both an overlay manager 850 and a P2P resource sharing controller manager 1040. For illustrative purposes only, the processor platform 2100 of FIG. 21 is illustrated as including both an overlay manager 850 and a P2P resource sharing controller 1040. In some examples, the processor 2100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device/node.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2112 implements the any of the example first node 810, the example second node 820, the example third node 830, or the example fourth node 840, the example first owner/controller device 860, the example second owner/controller device 862, and the example third owner/controller device 864. In an example in which the processor 2112 implements the fourth node 840 having both an overlay manager 850 and a P2P resource sharing controller 1010, the processor 2112 implements the example overlay manager 850, the example overlay constructor 902, the example overlay de-constructor 904, the example overlay network interface 906, the example resource discoverer and advertiser 907, the example overlay operation attestor 910, the example node attestor 912, the example node adder 914, the example first network interface configurer 916 (also referred to herein as the first interface configurer), the example node remover 918, the example second network interface card configurer 920 (also referred to herein as a second interface configurer), the example P2P resource sharing controller 1010, the example overlay inclusion controller 1015, the example overlay removal and addition requestor 1020, the example node attestor responder 1025, the example node operation attestor 1030, the example bid negotiator 1040, the example bid solicitor/requestor 1045, the example offer generator 1050, the example offer acceptor 1055, the example negotiation flow controller 1060, the example bid analyzer 1063, the example overlay interface configurer 1065, the example one or more compute resources 1085, and the example compute resource controller 1090.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), a Bluetooth® interface, a near field communication (NFC) interface, and/or a PCI express interface. In some examples, any of the local memory 2113, the volatile memory 2114, the non-volatile memory 2116, and the mass storage device 2128 can represent all or portions of the example node and resource data storage structure 1035, and/or the overlay data storage structure 908.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2124 are also connected to the interface circuit 2120 of the illustrated example. The output devices 2124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2126. The communication can be via, for example, an Ethernet connection, a digital subscriber line (DSL) connection, a telephone line connection, a coaxial cable system, a satellite system, a line-of-site wireless system, a cellular telephone system, etc. In some examples, the interface circuit 2120 represents three interface circuits and the respective ones of the three implement respective ones of the example configurable overlay interface 1070, the example bid requestor network interface 1075, and the example offer sharing network interface 1080.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, redundant array of independent disks (RAID) systems, and digital versatile disk (DVD) drives.

The machine executable instructions 2132 of FIGS. 11-18 may be stored in the mass storage device 2128, in the volatile memory 2114, in the non-volatile memory 2116, and/or on a removable non-transitory computer readable storage medium such as a CD or DVD. In some examples, any of the storage devices 2128 can implement the example the example overlay data storage structure 908, and the example node and resource data storage structure 1035.

Figure 22:
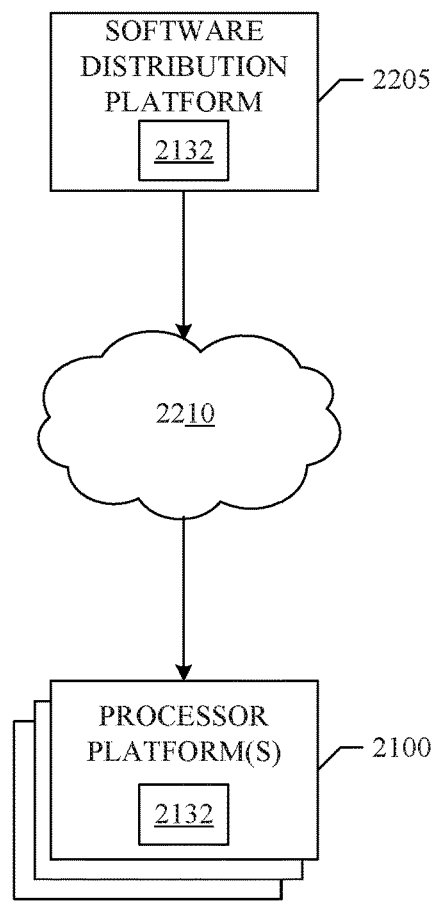
FIG. 22 is a block diagram of an example software distribution platform to distribute software (e.g., software corresponding to the example computer readable instructions of FIGS. 11-18) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2205 to distribute software such as the example computer readable instructions 2132 of FIG. 21 to third parties is illustrated in FIG. 22. The example software distribution platform 2205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 2032 of FIG. 20. The third parties may be consumers, users, retailers, OEMs, etc., who purchase and/or license the software for use and/or re-sale and/or sub-licensing. In the illustrated example, the software distribution platform 2205 includes one or more servers and one or more storage devices. The storage devices store the computer readable instructions 2032, which may correspond to the example computer readable instructions of FIGS. 11-18, as described above. The one or more servers of the example software distribution platform 2205 are in communication with a network 2210, which may correspond to any one or more of the Internet and/or any of the example networks 700 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 2032 from the software distribution platform 2205. For example, the software, which may correspond to the example computer readable instructions of FIGS. 11-18, may be downloaded to the example processor platform 2000, which is to execute the computer readable instructions 2032 to implement the example overlay manager 850 and the example second node 820. In some example, one or more servers of the software distribution platform 2205 periodically offer, transmit, and/or force updates to the software (e.g., the example computer readable instructions 2032 of FIG. 20) to ensure improvements, patches, updates, etc. are distributed and applied to the software at the end user devices.

From the foregoing, it will be appreciated that example methods, apparatus and articles of manufacture have been disclosed that permit the sharing of compute resources among nodes of a three tier network (including edge nodes) in a decentralized and peer-to-peer manner. The disclosed methods, apparatus and articles of manufacture improve the efficiency of using a computing device by improving the efficiency and reducing the overhead and latency typically involved in sharing resource among compute nodes of an edge (and in other network platforms). The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Example methods, apparatus, systems, and articles of manufacture to specific invention embodiments are disclosed herein. Further examples and combinations thereof include the following:

Example 1 includes an apparatus at an edge of a network, the apparatus comprising a first configurer to configure a network interface of a first node of the network in a first configuration, the first configuration to permit the first node to participate in a peer-to-peer resource bidding process with a plurality of other nodes of the network, and a second configurer to configure the network interface of the first node of the network in a second configuration, the second configuration to prevent the first node from participation in the peer-to-peer resource bidding process.

Example 2 includes the apparatus of example 1, wherein the first configurer is to configure the network interface in the first configuration responsive to a first request received from a device controlled by an owner of the device, and the second configurer is to configure the network interface of the first node in the second configuration responsive to a second request by the device.

Example 3 includes the apparatus of example 2, further including a network interface to communicate messages associated with the resource bidding process to at least some of the plurality of other nodes.

Example 4 includes the apparatus of example 1, further including a broadcaster to broadcast messages generated by the first node to at least some of the plurality of other nodes of the network, the first node to initiate the peer-to-peer resource bidding process with the at least some of the plurality of other nodes, and the messages generated by the first node associated with the initiation of the peer-to-peer resource bidding process.

Example 5 includes the apparatus of example 4, wherein the broadcast messages include at least one of a request for bids to perform a task on behalf of the first node using resources associated with at least some of the others of the plurality of nodes, the resource bidding process to occur between the nodes in a peer-to-peer manner, the nodes including a bid negotiator to perform the resource bidding process.

Example 6 includes the apparatus of example 1, further including an overlay operation attestor to authenticate and track execution of the task.

Example 7 includes the apparatus of example 6, wherein the overlay operation attestor is to generate a blockchain to track the execution of the task, the blockchain signed by one of the plurality of other nodes that has executed the task.

Example 8 includes the apparatus of example 1, further including a node attestor to authenticate the identity of the first node before the first node is permitted to participate in the peer-to-peer resource bidding process with the plurality of other nodes of the network.

Example 9 includes the apparatus of example 8, wherein the authenticator uses a root of trust exposed by the first node to authenticate the identity of the first node.

Example 10 includes a method to manage an overlay of nodes of a network, the method including configuring, by executing an instruction with at least one processor, a network interface of a first node of the network in a first configuration, the first configuration to permit the first node to be added to the overlay of nodes, the overlay of nodes permitted to participate in a peer-to-peer resource bidding process with a plurality of other nodes of the network, and configuring, by executing an instruction with at least one processor, the network interface of the first node in a second configuration, the second configuration to remove the first node from the overlay of nodes, the removal of the first node to prevent the first node from participating in the peer-to-peer resource bidding process.

Example 11 includes the method of example 10, wherein configuring the network interface in the first configuration or in the second configuration occurs responsive to a first request and a second request, respectively, the first and second requests received from a device controlled by an owner of the first node.

Example 12 includes the method of example 10, further including broadcasting messages generated by the first node to at least some of the plurality of other nodes of the network based on a request for bids message generated by the first node, the request for bid message to include a request for bids to perform a task on behalf of the first node using resources available at one of the plurality of other nodes of the network.

Example 13 includes the method of example 12, further including tracking execution of the task.

Example 14 includes the method of example 13, wherein the tracking of the execution of the task includes generating a blockchain to be signed by the one of the plurality of other nodes that has executed the task.

Example 15 includes the method of example 10, further including authenticating an identity of the first node to determine whether the first node will be permitted to participate in the peer-to-peer resource bidding process with the plurality of other nodes of the network.

Example 16 includes the method of example 15, wherein the authenticating of the identity of the first node includes accessing a root of trust exposed by the first node.

Example 17 includes the method of example 10, wherein first messages by which at least some of the plurality of other nodes included in the overlay make offers to perform the task on behalf of the first node are transmitted by the at least some of the plurality of other nodes included in the overlay to the first node, and wherein second messages by which the first node responds to such offers are broadcast, by a broadcast device to the at least some of the plurality of other nodes included in the overlay, wherein the broadcast refers to transmission of the second messages to the at least some of the plurality of other nodes included in the overlay at a same time.

Example 18 includes a non-transitory computer readable medium comprising instructions that, when executed by at least one processor, cause the at least one processor to at least configure a network interface of a first node of the network in a first configuration, the first configuration to permit the first node to be added to an overlay of nodes, the overlay of nodes permitted to participate in a peer-to-peer resource bidding process with a plurality of other nodes of the network, and configure the network interface of the first node in a second configuration, the second configuration to remove the first node from the overlay of nodes, the removal of the first node from the overlay to prevent the first node from participating in the peer-to-peer resource bidding process.

Example 19 includes the non-transitory computer readable medium of example 18, wherein the network interface is configured in the first configuration and in the second configuration responsive to a first request and a second request, respectively, the first and second requests generated by a device controlled by an owner of the first node.

Example 20 includes the non-transitory computer readable medium of example 18, wherein the instructions further cause the at least one processor to broadcast messages generated by the first node to at least some of the plurality of other nodes of the overlay based on a request for bids message generated by the first node, the request for bids message to identify a task to be executed on behalf of the first node using resources available at one of the plurality of other nodes of the overlay.

Example 21 includes the non-transitory computer readable medium of example 20, wherein the instructions further cause the at least one processor to track execution of the task by generating a blockchain, the blockchain to be signed by one of the plurality of other nodes of the overlay that has executed the task on behalf of the first node.

Example 22 includes the non-transitory computer readable medium of example 18, wherein the instructions further cause the at least one processor to authenticate an identity of the first node to determine whether the first node will be permitted to participate in the peer-to-peer resource bidding process with the plurality of other nodes of the overlay.

Example 23 includes the non-transitory computer readable medium of example 18, wherein first messages including offers to perform the task on behalf of the first node are transmitted by the at least some of the plurality of other nodes included in the overlay to the first node, and the instructions further cause the at least one processor to cause a broadcaster to broadcast a second message including a counter-offer to the at least some of the plurality of other nodes of the overlay.

Example 24 includes an apparatus at an edge of a network, the apparatus comprising first means for configuring a network interface of a first node of the network in a first configuration, the first configuration to permit the first node to participate in a peer-to-peer resource bidding process with a plurality of other nodes of the network, the plurality of other nodes of the network included in an overlay, and second means for configuring the network interface of the first node of the network in a second configuration, the second configuration to prevent the first node from participation in the peer-to-peer resource bidding process by preventing the first node from inclusion in the overlay.

Example 25 includes the apparatus example 1, wherein the first means for configuring is to configure the network interface in the first configuration responsive to a first request received from a device controlled by an owner of the device, and the second means for configuring is to configure the network interface of the first node in the second configuration responsive to a second request by the device.

Example 26 includes a compute node of a network, the compute node comprising a configurable interface, the configurable interface configurable by a first configurer of an overlay manager to permit the compute node to participate in a peer-to-peer resource bidding process with a plurality of other compute nodes of the network included in the overlay, and the configurable interface configurable by a second configurer of an overlay manager to prevent the compute node from being able to participate in the peer-to-peer resource bidding process with the plurality of other compute nodes of the network included in the overlay, and any of the compute node and the plurality of other compute nodes of the network included in the overly permitted to participate in the peer-to-peer resource bidding process managed by the overlay manager, an interface configurer to identify compute resource identifying information associated with compute resources available at the compute node and the overlay interface configurer to create bitstream information to be associated with respective ones of the compute resources, the interface configurer to configure the configurable overlay interface using the compute resource identifying information and the bitstream information associated with the respective ones of the compute resources for use in supplying one or more of the compute resources to ones of the plurality of other compute nodes included in the overlay, based on a result of the peer-to-peer resource bidding process.

Example 27 includes the compute node of example 26, further including an overlay removal and addition requestor to request at least one of addition or removal from the overlay based on a notification from a device controlled by an owner of the computer node.

Example 28 includes the compute node of example 26, further including a node attestor responder to respond to a request for attestation, received from the overlay manager, with compute node authenticating information, the compute node authenticating information used by the overlay manager to determine whether the compute node is to be granted inclusion in the overlay.

Example 29 includes the compute node of example 26, further including a bid requestor network interface to communicate a bid request to the overlay manager for broadcast to at least some of the plurality of other compute nodes included in the overlay, and a bid negotiator to negotiate with any of the plurality of other compute nodes included in the overlay that respond to the bid request with an offer.

Example 30 includes the compute node of example 26, further including an offer sharing network interface to share, with a first compute node of the plurality of other compute nodes included in the overlay, an offer responsive to a request for a bid, the first compute node having generated the request for the bid, and an offer generator to generate the offer, responsive to the request for the bid, with the first compute node.

Example 31 includes the compute node of example apparatus of example 30, further including a node operation attestor to authenticate execution of resource sharing operations in association with an accepted offer.

Example 32 includes the compute node of example 26, further including a negotiation flow controller to control a flow of negotiations between the compute node and the overlay manager and at least one of the plurality of other compute nodes included in the overlay.

Example 35 includes a method to control participation in an overlay of a plurality of compute nodes of a network, the method including generating, by executing an instruction with at least one processor, a request to be included in an overlay of a plurality of compute nodes, the plurality of compute nodes in include in the overlay permitted to participate in a peer-to-peer resource bidding process, supplying, by executing an instruction with at least one processor, node attestation information in response to a request from an overlay manager, the overlay manager to manage participation in the overlay, in response to a grant of permission to be included in the overlay, identifying, by executing an instruction with at least one processor, compute resources to be shared with the plurality of compute nodes of the overlay and generating respective bitstream information corresponding to respective ones of the compute resources, and engaging, by executing an instruction with at least one processor, in a peer-to-peer resource bidding process with the plurality of the compute nodes of the overlay.

Example 36 includes the method of example 35 wherein a first interface that communicates with the overlay operates in a first configuration when the permission is granted, the first configuration to permit participation in the overlay, and the first interface operates in a second configuration when the permission is not granted, the second configuration to prevent participation in the overlay.

Example 37 includes the method of example 35, further including communicating to the overlay manager, via the network, a request for bids to perform a task with resources of one or more of the compute nodes of the overlay, the overlay manager to broadcast the request for bids to the one or more compute nodes of the overlay.

Example 38 includes the method of example 37, further including broadcasting messages generated by the first node to at least some of the plurality of other compute nodes of the network based on a request for bids message generated by the first compute node, the request for bid message to include a request for bids to perform a task on behalf of the first compute node using resources available at one of the plurality of other compute nodes of the network.

Example 39 includes the method of example 38, further including tracking execution of the task.

Example 40 includes a non-transitory computer readable medium having instructions that, when executed by at least one processor, cause the at least one processor to at least participate in a peer-to-peer resource bidding process with compute nodes included in an overlay when a first interface is configured in a first configuration, and halt participation in the peer-to-peer resource bidding process when the first interface is configured in a second configuration.

Example 41 includes the non-transitory computer readable medium of example 40, wherein a network interface is configured in the first configuration and in the second configuration responsive to a first request and a second request, respectively, the first and second requests generated by a device controlled by an owner of the at least one processor.

Example 42 includes the non-transitory computer readable medium of example 40, wherein the overlay is managed by an overlay manager and the instructions further cause the at least one processor to transmit a first request for bids to the overlay manager, the overlay manager to broadcast the request for bids to at least some of the compute nodes included in the overlay, and responsive to a second request for bids, transmit to another node included the overlay, an offer to perform a task identified in the second request for bids, the second request for bids generated by a compute node included the overlay.

Example 43 includes the non-transitory computer readable medium of example 42, wherein the instructions further cause the at least one processor to report execution of the task via a blockchain to the overlay manager.

Example 44 includes the non-transitory computer readable medium of example 40, wherein the instructions further cause the at least one processor to perform a task associated with a second request for bids from another compute node included in the overlay in response to an offer to perform the task being accepted.

Example 45 is a computer-readable medium comprising instructions to perform the method of any of examples 35-39.

Example 46 is an apparatus comprising processing circuitry to perform the method of any of examples 35-39.

Example 47 is a computer-readable medium comprising instructions to perform the method of any of examples 35-39.

Example 48 is an apparatus comprising processing circuitry to perform the method of any of examples 35-39.

Example 49 is a computer-readable medium comprising instructions to perform the method of any of examples 35-39.

Example 50 is an apparatus comprising processing circuitry to perform the method of any of examples 35-39.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A first compute device comprising:
   interface circuitry;
   machine-readable instructions; and
   at least one processor circuit to be programmed by the machine-readable instructions to:
      authenticate an identity of a second compute device in response to a first request from the second compute device to be added to an overlay of compute devices, the first request to identify the second compute device and identify the overlay, the overlay associated with a peer-to-peer compute resource bidding process to permit compute resources among the compute devices of the overlay to be shared;
      configure a network interface of the second compute device in a first configuration, the first configuration to cause the second compute device to be included in the overlay; and
      configure the network interface of the second compute device in a second configuration in response to a second request from the second compute device, the second request to identify the second compute device and identify the overlay, the second configuration to cause the second compute device to be removed from the overlay, the removal of the second compute device from the overlay to prevent the second compute device from participating in the peer-to-peer compute resource bidding process.

2. The first compute device of claim 1, wherein the interface circuitry is to communicate messages associated with the peer-to-peer compute resource bidding process to at least one of the other compute devices of the overlay.

3. The first compute device of claim 1, wherein one or more of the at least one processor circuit is to cause messages generated by the second compute device to be broadcast to at least one other compute device of the overlay, the second compute device is to initiate the peer-to-peer compute resource bidding process with the at least one other compute device of the overlay, and the messages are associated with initiation of the peer-to-peer compute resource bidding process.

4. The first compute device of claim 3, wherein the messages include a request for compute resource bids to perform a task on behalf of the second compute device using compute resources associated with the at least one other compute device of the overlay, the peer-to-peer compute resource bidding process to occur among ones of the compute devices of the overlay in a peer-to-peer manner.

5. The first compute device of claim 4, wherein one or more of the at least one processor circuit is to authenticate and track execution of the task.

6. The first compute device of claim 5, wherein one or more of the at least one processor circuit is to generate a blockchain to track the execution of the task, the blockchain signed by the at least one other compute device of the overlay that executed the task.

7. The first compute device of claim 1, wherein one or more of the at least one processor circuit uses a root of trust exposed by the second compute device to authenticate the identity of the second compute device.

8. A method comprising:
   accessing a first request from a second compute device at a first compute device, the first request to identify the second compute device and identify an overlay of compute devices, the compute devices of the overlay to share compute resources based on a peer-to-peer compute resource bidding process;

authenticating an identity of the second compute device in response to the first request;

configuring, by at least one processor circuit of the first compute device programmed by at least one instruction, a network interface of the second compute device to cause the second compute device to be added to the overlay; and configuring, by one or more of the at least one processor circuit, the network interface in a second configuration in response to a second request from the second compute device, the second request to identify the second compute device and identify the overlay, the second configuration to cause the second compute device to be removed from the overlay, the removal of the second compute device from the overlay to prevent the second compute device from participating in the peer-to-peer compute resource bidding process.

9. The method of claim 8, further including broadcasting messages generated by the second compute device to at least one other compute device of the overlay, the messages to include a request for compute resource bids to perform a task on behalf of the second compute device using compute resources available at the at least one other compute device of the overlay.

10. The method of claim 9, further including tracking execution of the task.

11. The method of claim 10, wherein the tracking of the execution of the task includes generating a blockchain to be signed by the at least one other compute device of the overlay that executed the task.

12. The method of claim 9, wherein the messages are first messages, and the at least one other compute device of the overlay make offers to perform the task on behalf of the second compute device by transmitting second messages to the second compute device, and further including broadcasting third messages by which the second compute device responds to such offers to the at least one other compute device of the overlay.

13. The method of claim 8, wherein the authenticating of the identity of the second compute device includes accessing a root of trust exposed by the second compute device.

14. At least one non-transitory computer readable medium comprising computer readable instructions to cause at least one processor circuit of a first compute device to at least:

authenticate an identity of a second compute device in response to a first request from the second compute device to be added to an overlay of compute devices, the first request to identify the second compute device and identify the overlay, the overlay associated with a peer-to-peer compute resource bidding process to permit the compute devices of the overlay to share compute resources;

configure a network interface of the second compute device in a first configuration, the first configuration to cause the second compute device to be added to the overlay; and configure the network interface of the second compute device in a second configuration in response to a second request from the second compute device, the second request to identify the second compute device and identify the overlay, the second configuration to cause the second compute device to be removed from the overlay, the removal of the second compute device from the overlay to prevent the second compute device from participating in the peer-to-peer compute resource bidding process.

15. The at least one non-transitory computer readable medium of claim 14, wherein the computer readable instructions are to cause one or more of the at least one processor circuit to broadcast messages generated by the second compute device to at least one other compute device, the messages to identify a task to be executed on behalf of the second compute device using compute resources available at the at least one other compute device of the overlay.

16. The at least one non-transitory computer readable medium of claim 15, wherein the computer readable instructions are to cause one or more of the at least one processor circuit to track execution of the task by generating a blockchain, the blockchain to be signed by the at least one other compute device of the overlay that executed the task on behalf of the second compute device.

17. The at least one non-transitory computer readable medium of claim 15, wherein the messages are first messages, offers to perform the task on behalf of the second compute device are included in second messages transmitted by the at least one other compute device of the overlay to the second compute device, and the computer readable instructions are to cause one or more of the at least one processor circuit to broadcast a third message including a counter-offer to the at least one other compute device of the overlay.

18. A first compute device comprising:

means for authenticating an identity of a second compute device in response to a first request from the second compute device to be added to an overlay of compute devices, the first request to identify the second compute device and identify the overlay, the overlay associated with a peer-to-peer compute resource bidding process to permit compute resources among the compute devices of the overlay to be shared; means for configuring a network interface of the second compute device in a first configuration, the first configuration to cause the second compute device to be included in the overlay; and means for configuring the network interface of the second compute device in a second configuration in response to a second request from the second compute device, the second request to identify the second compute device and identify the overlay, the second configuration to cause the second compute device to be removed from the overlay, the removal of the second compute device from the overlay to prevent the second compute device from participating in the peer-to-peer compute resource bidding process.

* * * * *

UNITED STATES PATENT AND TRADEMARK OFFICE
CERTIFICATE OF CORRECTION

PATENT NO. : 12,041,177 B2
APPLICATION NO. : 17/033446
DATED : July 16, 2024
INVENTOR(S) : Guim Bernat et al.

It is certified that error appears in the above-identified patent and that said Letters Patent is hereby corrected as shown below:

In the Drawings

Sheet 10, FIG. 10, below reference numeral 1015, replace "OVERALY" with --OVERLAY--

Signed and Sealed this
First Day of October, 2024

Katherine Kelly Vidal
*Director of the United States Patent and Trademark Office*